United States Patent [19]
Kimura et al.

[11] Patent Number: 5,631,944
[45] Date of Patent: May 20, 1997

[54] ROTARY CATHODE X-RAY TUBE EQUIPMENT

[75] Inventors: Yutaro Kimura; Tetsuhiko Ikeshima; Hiromichi Tonami, all of Kyoto; Ikuo Konishi, Nara; Hiroshi Horikawa, Kyoto; Akihiro Daikoku, Hyogo; Shigekazu Sakabe, Hyogo; Masao Inoue, Hyogo; Akinori Yamasaki, Hyogo, all of Japan

[73] Assignees: Shimadzu Corporation, Kyoto; Mitsubishi Denki Kabushiki Kaisha, Tokyo, both of Japan

[21] Appl. No.: 697,682

[22] Filed: Aug. 28, 1996

Related U.S. Application Data

[60] Continuation of Ser. No. 531,873, Sep. 21, 1995, abandoned, which is a division of Ser. No. 434,171, May 3, 1995, Pat. No. 5,481,585, which is a continuation of Ser. No. 79,913, Jun. 23, 1993, abandoned.

[30] Foreign Application Priority Data

Sep. 18, 1992 [JP] Japan ...................... 4-249255

[51] Int. Cl.$^6$ ...................... H01J 35/04
[52] U.S. Cl. ...................... 378/134; 378/136
[58] Field of Search ...................... 378/131–136, 378/101, 108, 109, 110, 111, 112, 113, 114, 115

[56] References Cited

U.S. PATENT DOCUMENTS

| | | | |
|---|---|---|---|
| 4,066,906 | 1/1978 | Hounsfield et al. | 250/445 T |
| 4,099,059 | 7/1978 | Distler | 250/445 T |
| 4,620,313 | 10/1986 | Erker | 378/19 |
| 4,961,208 | 10/1990 | Okada | 378/17 |
| 5,090,048 | 2/1992 | Blake | 378/202 |
| 5,109,397 | 4/1992 | Gordon et al. | 378/205 |
| 5,268,955 | 12/1993 | Burke et al. | 378/135 |
| 5,305,363 | 4/1994 | Burke et al. | 378/134 |
| 5,481,585 | 1/1995 | Kimura et al. | 378/134 |

FOREIGN PATENT DOCUMENTS

| | | |
|---|---|---|
| 0456114A2 | 11/1991 | European Pat. Off. |
| 0456114A3 | 11/1991 | European Pat. Off. |
| 0456114 | 11/1991 | European Pat. Off. |
| 58-115738 | 7/1983 | Japan |
| 4-212335 | 8/1992 | Japan |
| 4-212334 | 8/1992 | Japan |
| 2244900 | 12/1991 | United Kingdom |

*Primary Examiner*—Don Wong
*Attorney, Agent, or Firm*—Burns, Doane, Swecker & Mathis, LLP

[57] ABSTRACT

The rotary cathode X-ray tube equipment of present invention is constructed so as to permit radiation of X-ray from all directions with respect to the whole circumference of a subject, and is used for x-ray CT. The equipment of the invention is constructed to prevent an X-ray radiation window 40 of a low strength from being influenced by atmospheric deformations of a vacuum vessel 1 or by machining and assembling errors, for example by using a joint portion disposed between the X-ray radiation window and an inner ring and having both a surface perpendicular to a rotational axis of a rotary member and a cylindrical surface parallel to the rotational axis, a face seal formed on the surface of the joint portion perpendicular to the rotational axis, and an axial seal formed on the cylindrical surface of the joint portion parallel to the rotational axis.

5 Claims, 12 Drawing Sheets

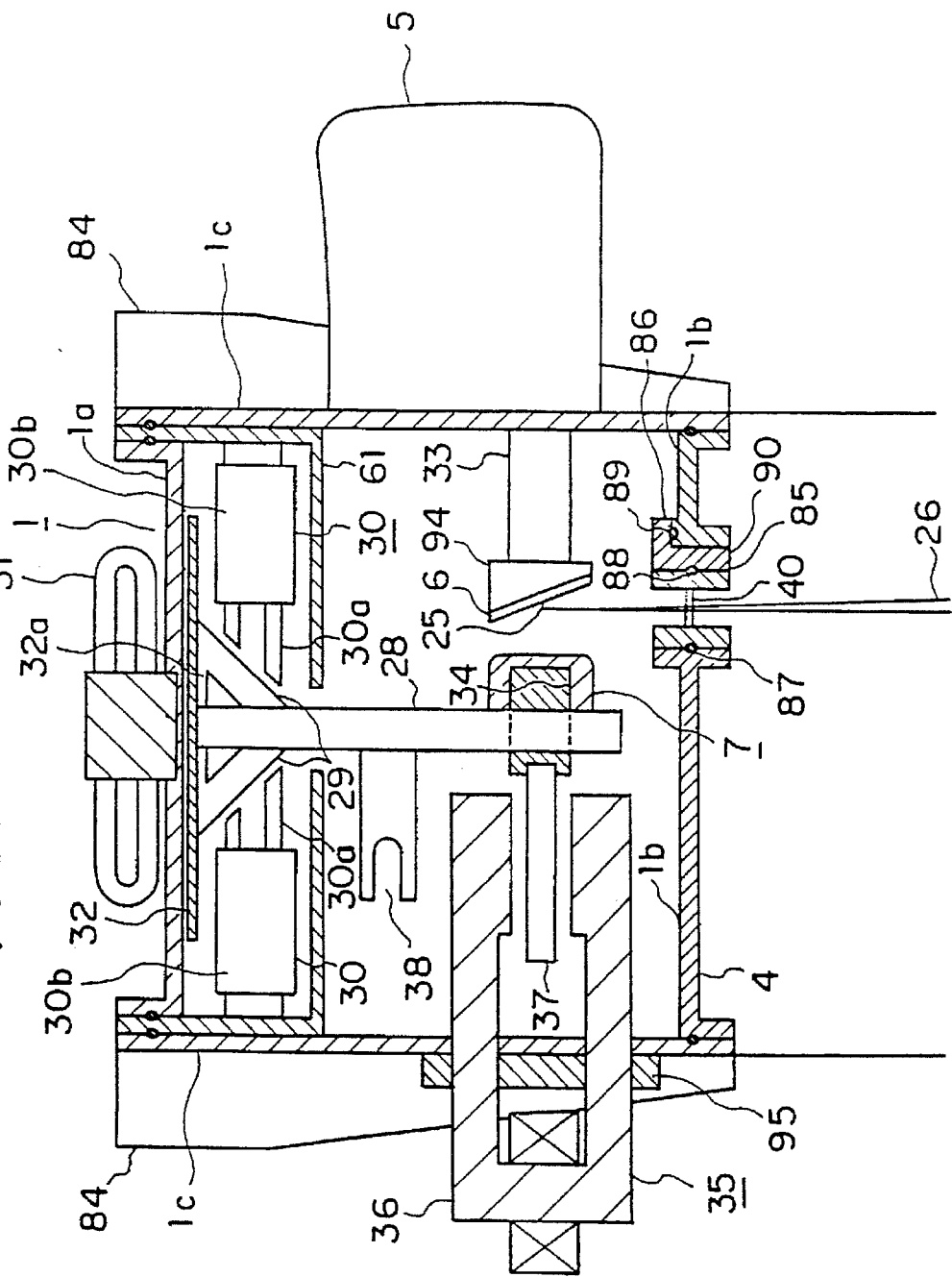

ROTARY CATHODE X-RAY TUBE EQUIPMENT

This application is a continuation of application Ser. No. 08/531,873, filed Sep. 21, 1995, now abandoned, which is a divisional of application Ser. No. 08/434,171, filed May 3, 1995, now U.S. Pat. No. 5,481,585 which a continuation of application Ser. No. 08/079,913, filed Jun. 23, 1993 now abandoned.

BACKGROUND OF THE INVENTION

1. Field of the Invention

The present invention relates to a rotary cathode X-ray tube equipment for X-ray CT which is constructed so as to permit radiation of X-ray from all directions with respect to the whole circumference of a subject.

2. Description of the Prior Art

FIG. 1 is a sectional view of a conventional rotary cathode X-ray tube equipment which is disclosed, for example, in Japanese Patent Laid Open No. 115738/83. In the same figure, a vacuum vessel 1 is installed on the floor through a support base 2. The vacuum vessel 1 is in the form of a ring provided centrally with a subject insertion hole 4 for passing a subject 3 therethrough. Its interior is maintained in high vacuum by means of a vacuum pump 5. An anode target 6 and a cathode portion 7 are disposed at a predetermined spacing within the vacuum vessel 1, the cathode portion 7 being connected to brushes 8 and 9. Between the brushes 8, 9 and the cathode portion 7 is provided a shielding plate 75 so that dust resulting from wear of the brushes 8 and 9 may not move toward the cathode portion 7, to which is applied a high voltage level of about −70 kV.

The anode target 6 is for generating X-ray under the impingement thereon of an electron beam emitted from the cathode portion 7. It is formed in a ring shape and is rotatable about a rotational axis $\underline{a}$. More specifically, the anode target 6 is fixed to a target rotor 11 through a support member 10. The target rotor 11 is supported in a non-contact state by means of a magnet 12 which is for magnetic levitation, and is given a rotating torque by a drive means (not shown) so as to rotate around the rotational axis $\underline{a}$. In operation, a high voltage level of about +70 kV is applied from the exterior to the target rotor 11 through a brush 13.

A touch-down bearing 14 is disposed near the target rotor 11, for supporting the target rotor 11 when the power source for the magnetic levitation magnet 12 has turned off or when it has become impossible to control the magnet 12 properly. During normal rotation of the target rotor 11, the touch-down bearing 14 does not contact the same rotor.

On the other hand, the cathode portion 7 is ring-shaped and serves as a charged particle generating mechanism. It is fixed to a cathode-portion rotor 15. The cathode-portion rotor 15 is supported in a non-contact state by means of a magnet 16 which is for magnetic levitation and which is located inside the rotor 15, and is given a rotating torque by a drive means (not shown) so as to rotate about the rotational axis $\underline{a}$ in the direction opposite to the target rotor 11. Consequently, the cathode portion 7 rotates in the direction opposite to the anode target 6. Further, an X-ray radiation window 17 is provided, and near the window 17 are disposed a collimator 18 and a ring-like detector 19 which is coaxial with the rotational axis $\underline{a}$.

In the vicinity of the cathode-portion rotor 15 there is provided a touch-down bearing 20 which has the same function as that of the touch-down bearing 14. Between the brush 13 and the anode target 6 there is disposed a shielding plate 76 so that dust resulting from wear of the brush 13 may not move toward the anode target 6. The numerals 21 and 22 each denote a brush for placing a cathode-side rotor 23 and an anode-side rotor 24 at earth potential. Numerals 77 to 81 each denote an electrical insulator for insulation of a high voltage. Between the anode-side rotor 24 and the anode target 6 there is provided an insulating material 82, and between the cathode-side rotor 23 and the cathode portion 7 there is provided an insulating material 83.

The following description is now provided about the operation of the conventional rotary cathode X-ray tube equipment shown in FIG. 1. First, an electron beam emitted from the cathode portion 7 impinges on a focal point 25 of the anode target 6. X-ray 26 generated from the focal point 25 passes through the X-ray radiation window 17, the passes through the subject 3 and thereafter enters the ring-shaped detector 19. An output of the detector 19 is transmitted to a computer (not shown) for image reconstruction by means of a data collection circuit (not shown) and is converted to a coaxial tomography of the subject 3 in accordance with a predetermined reconstruction program.

In the conventional rotary cathode X-ray tube equipment constructed as above, since the magnetic levitation magnets 12 and 16 are disposed outside the vacuum vessel 1, the gap between each of the magnets 12, 16 and the object attracted thereby becomes large. Therefore, it is necessary for the magnets 12 and 16 to be strong. That is, the size, weight and power consumption of the rotary cathode X-ray tube equipment are increased.

SUMMARY OF THE INVENTION

In view of the foregoing, it is an object of the present invention to provide a rotary cathode X-ray tube equipment in which deformations of a vacuum vessel caused by the atmospheric pressure as well as machining and assembling errors do not exert any influence on a portion which is structurally low in strength.

It is another object of the present invention to provide a rotary cathode X-ray tube equipment which is far superior in accuracy and performance to the existing equipment and which can be realized at a relatively low cost.

It is a further object of the present invention to provide a rotary cathode X-ray tube equipment which permits the omission of components, simplification of its structure and reduction in size of components, and further permits the reduction of its size, weight and cost.

It is still another object of the present invention to provide a rotary cathode X-ray tube equipment which permits mitigating demands concerning the machining accuracy for components and further permits easy and inexpensive manufacture of components.

It is still further object of the present invention to provide a rotary cathode X-ray tube equipment of high reliability capable of improving the entire efficiency in comparison with the existing equipment.

According to the first aspect of the present invention, for achieving the above-mentioned objects, there is provided a rotary cathode X-ray tube equipment having a joint portion disposed between an X-ray radiation window and an inner ring and provided with both a surface perpendicular to a rotational axis of a rotary member and a cylindrical surface parallel to the said rotational axis, further having a face seal provided on the surface of the joint portion perpendicular to the rotational axis and an axial seal provided on the cylindrical surface parallel to the rotational axis.

Hence, in the rotary cathode X-ray tube equipment according to the first aspect of the invention, atmospheric deformations in the rotational axis direction as well as machining and assembling errors in the same direction are absorbed by the face seal, while machining and assembling errors in the direction perpendicular to the rotational axis are absorbed by the axial seal.

According to the second aspect of the present invention there is provided a rotary cathode X-ray tube equipment in which an anode target is placed at a high potential, while a cathode portion is placed at a potential close to the earth potential.

Hence, in the rotary cathode X-ray tube equipment according to the second aspect of the invention, it is not necessary to provide insulation between the cathode portion and a rotor.

According to the third aspect of the present invention there is provided a rotary cathode X-ray tube equipment having a shielding plate made of an electrically conductive material and disposed between an anode target as well as a cathode portion and a filament current supply means as well as a power conducting portion.

Hence, in the rotary cathode X-ray tube equipment according to the third aspect of the invention, the cathode portion and the anode target are disposed on one side of the rotary member, while the power generating portion and the power conducting portion are disposed on the other side of the rotary member.

According to the fourth aspect of the present invention, there is provided a rotary cathode X-ray tube equipment having a power conducting anode fixed to a rotary member and connected to a cathode portion and also having a power conducting cathode fixed to a vacuum vessel and connected to one end of a high voltage power supply, and in which the perveance between the power conducting cathode and the power conducting anode is set 100 times or more as large as the perveance between the cathode portion and the anode target.

Hence, in the rotary cathode X-ray tube equipment according to the fourth aspect of the invention, a non-contact connection is made between the high voltage power supply and the cathode portion, and the potential of the rotating portion is suppressed to below several hundred volts.

According to the fifth aspect of the present invention, there is provided a rotary cathode X-ray tube equipment having an electromagnet fixed to a vacuum vessel and functioning to generate a magnetic field, and also having a power generating coil connected to filament and adapted to rotate together with a rotary member and thereby pass across the magnetic field generated by the electromagnet.

Hence, in the rotary cathode X-ray tube equipment according to the fifth aspect of the invention, the supply of an electric current to the filament is performed in a non-contact state.

According to the sixth aspect of the present invention, there is provided a rotary cathode X-ray tube equipment having a magnetic field detector fixed to a vacuum vessel for detecting a magnetic field created in a power generating coil by an electric current flowing through the same coil.

Hence, in the rotary cathode X-ray tube equipment according to the sixth aspect of the invention, the electric current flowing in the power generating coil is detected by detection of the magnetic field created by the same coil which detection is made by the magnetic field detector.

According to the seventh aspect of the present invention there is provided a rotary cathode X-ray tube equipment in which a common magnet is used for both an electromagnet and a magnet for magnetic levitation.

Hence, in the rotary cathode X-ray tube equipment according to the seventh aspect, a magnet is used in common for both the electromagnet and the magnetic levitation magnet.

According to the eighth aspect of the present invention, there is provided a rotary cathode X-ray tube equipment, in which at least a portion of a magnet for magnetic levitation is disposed within a vacuum vessel.

Hence, in the rotary cathode X-ray tube equipment according to the eighth aspect of the invention, the gap between the magnetic levitation magnet and an object to be attracted becomes smaller.

According to the ninth aspect of the present invention, there is provided a rotary cathode X-ray tube equipment in which opposed faces of a magnet for magnetic levitation and an object to be attracted are inclined with respect to a rotational axis of a rotary member, and the attractive force of the magnetic levitation magnet has both a component acting in the rotational axis direction and a component in the radial direction of the rotary member.

Hence, in the rotary cathode X-ray tube equipment according to the ninth aspect of the invention, the magnet for magnetic levitation generates attractive forces in two directions—one along the rotational axis of the rotary member and the other perpendicular thereto—.

According to the tenth aspect of the present invention, there is provided a rotary cathode X-ray tube equipment in which an object to be attracted is connected to both a rotary member and a rotor, the rotor being integral with the rotary member.

Hence, in the rotary cathode X-ray tube equipment according to the tenth aspect of the invention, the object to be attracted and the rotor are made integral in construction.

According to the eleventh aspect of the present invention, there is provided a rotary cathode X-ray tube equipment having a plurality of magnets for magnetic levitation.

Hence, in the rotary cathode X-ray tube equipment according to the eleventh aspect of the invention, the size of each magnet for magnetic levitation is made smaller by using plural such magnets.

According to the twelfth aspect of the present invention, there is provided a rotary cathode X-ray tube equipment in which the mounting position of each magnet for magnetic levitation is adjustable.

Hence, in the rotary cathode X-ray tube equipment according to the twelfth aspect of the invention, the position of each magnetic levitation magnet is adjusted at the time of mounting thereof.

According to the thirteenth aspect of the present invention, there is provided a rotary cathode X-ray tube equipment having a plurality of magnets for magnetic levitation which are attached to an inner plate mounted to a vacuum vessel.

Hence, in the rotary cathode X-ray tube equipment according to the thirteenth aspect of the present invention, the position of each magnetic levitation magnet attached to the inner plate is finely adjusted.

According to the fourteenth aspect of the present invention, there is provided a rotary cathode X-ray tube equipment in which, out of magnet for magnetic levitation, the size of one having an attractive force component positioned in a direction of pulling up a rotary member against gravity is larger than the size of one having an attractive force component positioned in a direction of pulling down the rotary member.

Hence, in the rotary cathode X-ray tube equipment according to the fourteenth aspect of the invention, the size of a magnet for magnetic levitation which is not required to generate a large attractive force is made smaller.

According to the fifteenth aspect of the present invention, there is provided a rotary cathode X-ray tube equipment in which, out of the total number of magnets for magnetic levitation, the number of magnets having an attractive force component positioned in a direction of pulling up a rotary member against gravity is larger than the number of magnets having an attractive force component positioned in a direction of pulling down the rotary member.

Hence, in the rotary cathode X-ray tube equipment according to the fifteenth aspect of the invention, the magnets for magnetic levitation located in positions not required to generate a large attractive force are omitted.

According to the sixteenth aspect of the present invention, there is provided a rotary cathode X-ray tube equipment having an inclination angle detecting mechanism for detecting an inclination angle of a vacuum vessel and also having a levitation magnet control section which makes control in accordance with an output signal of the inclination angle detecting mechanism to increase an attractive force of a magnetic levitation magnet located in a position where its attractive force for pulling up a rotary member against gravity must be increased and decrease an attractive force of a magnetic levitation magnet located in a position where the attractive force must be decreased.

Hence in the rotary cathode X-ray tube equipment according to the sixteenth aspect of the invention, an inclination angle of the vacuum vessel is detected by the inclination angle detecting mechanism, and upon tilting of the vacuum vessel, the attractive force of a predetermined magnet for magnetic levitation is increased by the levitation magnet control section.

According to the seventeenth aspect of the present invention, there is provided a rotary cathode X-ray tube equipment in which a front end of a yoke portion is disposed within a vacuum vessel.

Hence, in the rotary cathode X-ray tube equipment according to the seventeenth aspect of the invention, gas is evolved outside the vacuum vessel.

According to the eighteenth aspect of the present Invention, there is provided a rotary cathode X-ray tube equipment in which a non-contact displacement meter for detecting the position of a rotary member is used and it measures a displacement of an inclined surface of an object to be attracted.

Hence, in the rotary cathode X-ray tube equipment according to the eighteenth aspect of the invention, the non-contact displacement meter performs both detection of a levitation state of the rotary member and detection of a rotary member position in the rotational axis direction.

According to the nineteenth aspect of the present invention, there is provided a rotary cathode X-ray tube equipment using a non-contact displacement meter attached to an inner plate which is mounted to a vacuum vessel.

Hence, in the rotary cathode X-ray tube equipment according to the nineteenth aspect of the invention, the mounting position of the non-contact displacement meter attached to the inner plate is finely adjusted.

According to the twentieth aspect of the present invention, there is provided a rotary cathode X-ray tube equipment having at least one touch-down bearing whose central axis is separate from the rotational axis of a rotary member.

Hence, in the rotary cathode X-ray tube equipment according to the twentieth aspect of the invention, the central axis of the touch-down bearing is made separate from the rotational axis of the rotary member to reduce the size of the same bearing.

According to the twenty-first aspect of the present invention, there is provided a rotary cathode X-ray tube equipment in which the mounting position of a touch-down bearing used is adjustable.

Hence, in the rotary cathode X-ray tube equipment according to the twenty-first aspect of the invention, there is performed a fine adjustment for the mounting position of the touch-down bearing.

According to the twenty-second aspect of the present invention, there is provided a rotary cathode X-ray tube equipment having a touch-down bearing attached to an inner plate which is mounted to a vacuum vessel.

Hence, in the rotary cathode X-ray tube equipment according to the twenty-second aspect of the invention, the mounting position of the touch-down bearing attached to the inner plate is finely adjusted.

According to the twenty-third aspect of the present invention, there is provided a rotary cathode X-ray tube equipment in which, within a movable range of a tilting mechanism, a centroid position of a portion tilted by the tilting mechanism never assumes a position vertically below the rotational axis of the tilting mechanism, and it is not coincident with the rotational axis of the tilting mechanism.

Hence, in the rotary cathode X-ray tube equipment according to the twenty-third aspect of the invention, the gravity of the portion tilted by the tilting mechanism gives a unidirectional torque of a certain value or larger to a drive mechanism for the tilting mechanism.

According to the twenty-fourth aspect of the present invention, there is provided a rotary cathode X-ray tube equipment having a torque applying device for applying torque which is always unidirectional to a rotative shaft of a tilt mechanism.

Hence, in the rotary cathode X-ray tube equipment according to the twenty-fourth aspect of the invention, the torque applying device applies a torque which is unidirectional and has a certain value or larger to the drive mechanism for the tilting mechanism.

According to the twenty-fifth aspect of the present invention, there is provided a rotary cathode X-ray tube equipment having a rotational angle detecting means for detecting a rotational angle of a rotary member, a non-contact displacement meter for detecting a position of the rotary member, a memory section for storing a deformation quantity including a machining error and a detection error of the non-contact displacement meter, and a deformation correcting circuit for correcting a detected signal at every rotational angle of the rotary member.

Hence, in the rotary cathode X-ray tube equipment according to the twenty-fifth aspect of the invention, a rotational angle of the rotary member is detected by the rotational angle detecting means, and a deformation quantity at every rotational angle is stored by the memory section, which deformation quantity is corrected by the deformation correcting circuit.

According to the twenty-sixth aspect of the present invention, there is provided a rotary cathode X-ray tube equipment having a drive means, the drive means comprising a stator disposed on the side opposite to a subject insertion hole with respect to a vacuum vessel and a rotor disposed within the vacuum vessel and fixed to a rotary member.

Hence, in the rotary cathode X-ray tube equipment according to the twenty-sixth aspect of the invention, the thickness of the equipment is reduced by disposing the stator on the side opposite to the subject insertion hole with respect to the vacuum vessel.

According to the twenty-seventh aspect of the present invention, there is provided a rotary cathode X-ray tube equipment in which a stator used is constituted by at least one rectilinear or arcuate stator, and this rectilinear or arcuate stator and a rotor constitute a linear induction motor.

Hence, in the rotary cathode X-ray tube equipment according to the twenty-seventh aspect of the invention, the mounting space for the stator is kept to a minimum required by forming the stator as at least one arcuate stator.

According to the twenty-eighth aspect of the present invention, there is provided a rotary cathode X-ray tube equipment in which the yoke facing portion of an outer ring is thinner than the yoke non-facing portion thereof.

Hence, in the rotary cathode X-ray tube equipment according to the twenty-eighth aspect of the invention, the yoke facing portion of the outer ring is made thin while maintaining a required strength in the thicker portion of the outer ring.

According to the twenty-ninth aspect of the present invention, there is provided a rotary cathode X-ray tube equipment in which an object to be attracted and a rotor-back yoke present on the back of a rotor are integral with each other.

Hence, in the rotary cathode X-ray tube equipment according to the twenty-ninth aspect of the invention, a rotary member is reinforced by the object to be attracted which is high in rigidity.

According to the thirtieth aspect of the present invention, there is provided a rotary cathode X-ray tube equipment in which an encoder for detecting a rotational angle of a rotary member is constituted by a light emitting portion and a light sensing portion which are disposed on both sides of the rotary member and a plurality of detection holes of the rotary member formed in positions through which the light from the light emitting portion passes.

Hence, in the rotary cathode K-ray tube equipment according to the thirtieth aspect of the invention, an encoder of a large diameter is constituted by the light emitting portion, photosensor and detection holes.

According to the thirty-first aspect of the present invention, there is provided a rotary cathode K-ray tube equipment in which a light emitting portion and a light sensing portion are attached to inner plates which are mounted to a vacuum vessel.

Hence, in the rotary cathode X-ray tube equipment according to the thirty-first aspect of the invention, the position of the light emitting portion and that of the light sensing portion attached to the inner plates are finely adjusted.

According to the thirty-second aspect of the present invention, there is provided a rotary cathode X-ray tube equipment having a multiplying circuit, the multiplying circuit comprising a phase comparator to which is inputted an output signal of an encoder, a VF converter for converting an output signal of the phase comparator into a pulse having a frequency proportional to the voltage thereof, and a frequency divider circuit which counts pulses provided from the VF converter and outputs one pulse to the phase comparator at every counting of a preset number, the phase comparator comparing the phase of the output signal from the encoder with that of the output signal from the frequency divider circuit.

Hence, in the rotary cathode X-ray tube equipment according to the thirty-second aspect of the present invention, the output signal of the phase comparator is converted to a pulse having a frequency proportional to the voltage thereof by means of the VF converter, then the frequency of the pulse is divided by the frequency divider circuit, and a comparison is made between the phase of the output signal from the encoder and that of the output signal from the frequency dividing circuit by means of the phase comparator.

The above and further objects and novel features of the invention will more fully appear from the following detailed description when the same is read in connection with the accompanying drawing. It is to be expressly understood, however, that the drawings are for purpose of illustration only and are not intended as a definition of the limits of the invention.

BRIEF DESCRIPTION OF THE DRAWINGS

FIG. 3 is a partially enlarged view of FIG. 2;

DETAILED DESCRIPTION OF THE PREFERRED EMBODIMENTS

Preferred embodiments of the present invention will be described in detail hereinunder referring to the accompanying drawings.

Embodiment 1

Figure 1:
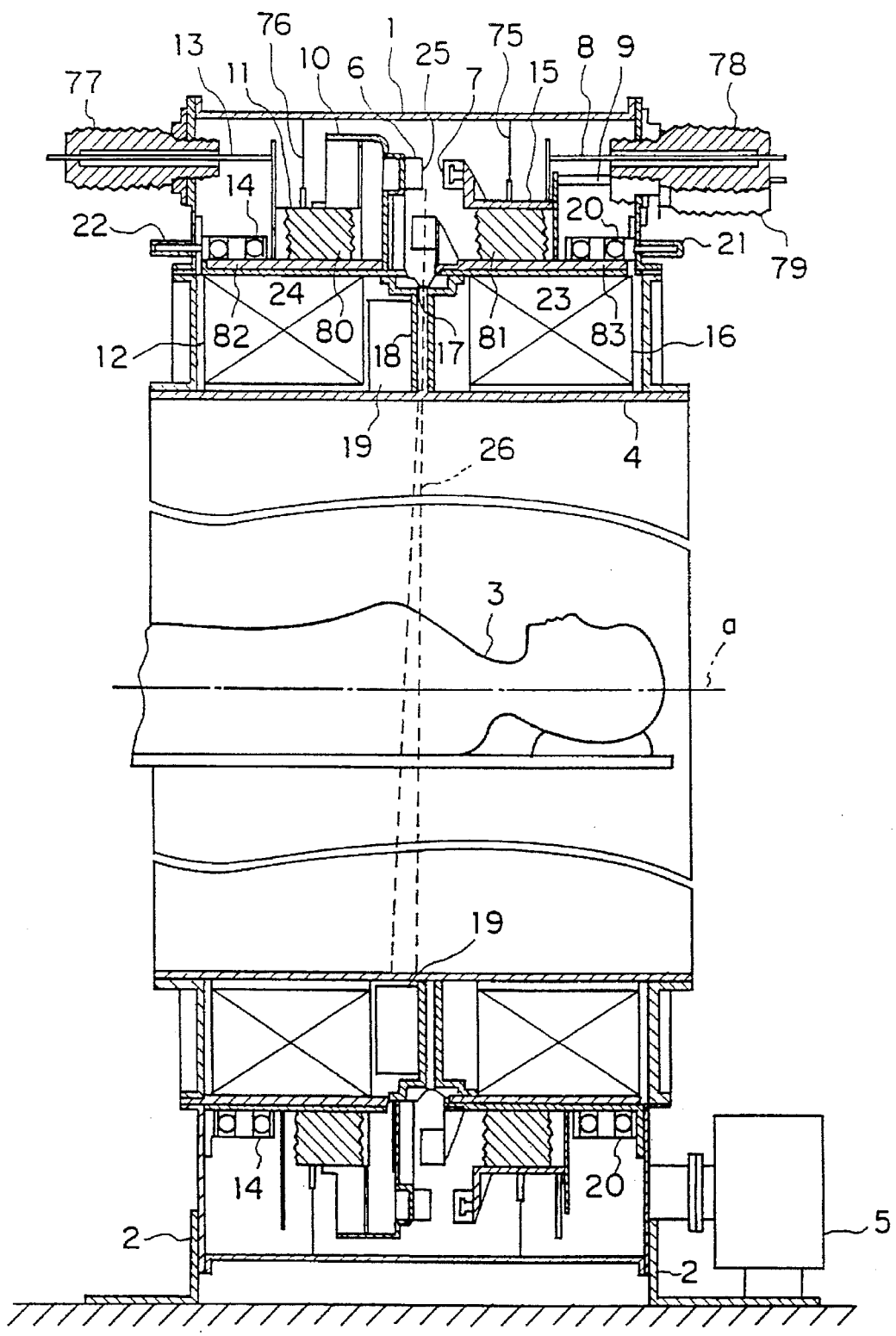
FIG. 1 is a sectional view showing a conventional rotary cathode X-ray tube equipment.
Figure 2:
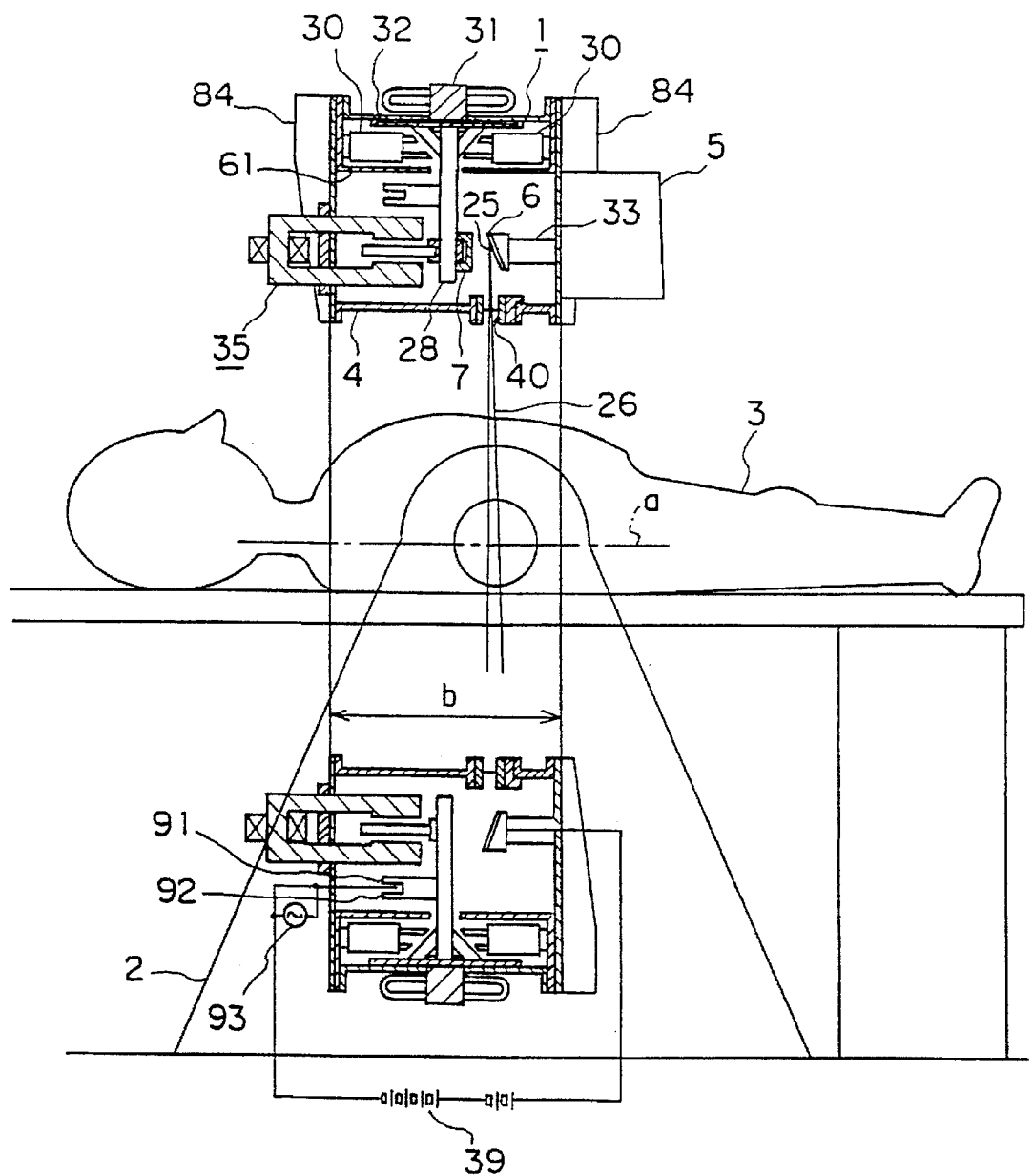
FIG. 2 is a sectional view schematically showing a rotary cathode X-ray tube equipment according to embodiment 1 of the present invention.

First, an outline of embodiment 1 will be given with reference to FIGS. 2 and 3. FIG. 2 is a sectional view illustrating a rotary cathode X-ray tube equipment according to embodiment 1 of the present invention, and FIG. 3 is a partially enlarged view of FIG. 2, in which figures the portions equal or corresponding to those shown in FIG. 1 are indicated by the same reference numerals as in FIG. 1 and explanations thereof will be omitted. In FIGS. 2 and 3, a vacuum vessel 1 is composed of an outer ring 1a, an inner ring 1b and two side plates 1c. Within the vacuum vessel 1 there is disposed a disk-like rotary member 28 fabricated of aluminum or the like, and objects 29 to be attracted, which are made of a magnetic material, are fixed to the rotary member 28. Further, in an opposed state to the objects 29 to be attracted, magnets 30 for magnetic levitation are attached to the side plates 1c of the vacuum vessel 1 each through an inner plate 61.

A magnetic levitation mechanism is constituted by the objects 29 to be attracted and the magnetic levitation magnets 30. The rotary member 28 is supported rotatably about a rotational axis a thereof by means of the magnetic levitation mechanism. On the side opposite to a subject insertion hole 4 with respect to the vacuum vessel 1 there are disposed stators 31, which are fixed to the outer ring 1a of the vacuum vessel 1. Within the vacuum vessel 1, a rotors 32 formed of a aluminum or the like is disposed in close proximity to the stators 31. A drive means is constituted by the stators 31 and rotor 32.

A cathode portion 7 is fixed to the rotary member 28 and it rotates around the rotational axis a together with the rotary member 28. A ring-like anode target 6 disposed in an opposed relation to the cathode portion 7 is fixed to a side plate 1c of the vacuum vessel 1 with an electric insulator 33. Within the cathode portion 7 is accommodated a filament 34 for the emission of thermoelectrons, and a power generating portion 35 for supplying an electric current to the filament 34 is disposed on the side opposite to the cathode portion 7 with respect to the rotary member 28. The power generating portion 35 is composed of an electromagnet 36 and a power generating coil 37. Near the power generating portion 35 is disposed a power conducting portion 38 for applying a high voltage between the anode target 6 and the cathode portion 7 which voltage is provided from a high voltage power supply 39. An X-ray radiation window 40 is attached to the inner ring 1b of the vacuum vessel 1. The rotary cathode X-ray tube equipment can tilt around a subject 3 under the operation of a tilting mechanism 71 (see FIG. 10).

Now, the operation of embodiment 1 of the present invention illustrated in FIGS. 2 and 3 will be outlined. The rotary member 28 is supported by the magnetic levitation mechanism and is rotated about the rotational axis a by the drive means. In this state, the filament 34 is heated by an electric current supplied from the power generating portion 35, and when a voltage provided from the high voltage power supply 39 is applied a between the anode target 6 and the cathode portion 7 (the anode target 6 is placed at a high voltage and the cathode portion 7 substantially at the earth potential), thermoelectrons are emitted from the cathode portion 7 and impinge against a focal point 25 on the anode target 6. X-ray 26 is generated from the focal point 25 and is radiated from the X-ray radiation window 40 which is ring-like. Subsequent operations are the same as in the prior art, so described thereof are omitted here.

Features of embodiment 1 will now be described in detail. As shown in FIGS. 2 and 3, since the X-ray passing portion of the X-ray radiation window 40 is thin-walled, having a thickness of 4 to 5 mm, the vacuum vessel 1 is reinforced by reinforcing beams 84 so that the atmospheric pressure from the side plates 1c may not be exerted on the X-ray passing portion. Eight reinforcing beams 84 are provided on each side plate 1c of the ring-like vacuum vessel 1, so a total of sixteen beams 84 are provided in total. However, with only the reinforcing beams 84, it is impossible to completely prevent the influence of the atmospheric pressure. Further, since the subject insertion hole 4 is present in the vacuum vessel 1 and the same vessel is large-sized, having an outside diameter of 1,400 mm and an inside diameter of 800 mm, it is difficult to enhance the machining accuracy for the outer and inner rings 1a, 1b and two side plates 1c, as well as their assembling accuracy, sometimes resulting in that an extra force is exerted on the X-ray radiation window 40.

In view of the above points, a joint portion 90 having a surface 85 perpendicular to the rotational axis of the rotary member 28 and a cylindrical surface 86 parallel to the rotational axis is provided between the X-ray radiation window 40 and the inner ring 1b, and further there also is provided a face seal 87. Consequently, atmospheric deformations and machining and assembling errors in the rotational axis direction can be absorbed by an axial seal 89, while machining and assembling errors in the direction perpendicular to the rotational axis can be absorbed by face seals 87, 88, so that no extra force is applied to the X-ray radiation window 40. It is necessary to fabricate the joint portion 90 and the inner ring 1b using materials whose thermal expansion coefficients are closely akin to each other so that the size of the gap wherein the axial seal 89 is disposed may not greatly change against temperature changes.

In the case of applying a high voltage approximately 120 to 130 kV, the whole of the vacuum vessel 1 is placed at the earth potential, the cathode portion 7 approximately at the earth potential (as will be described later) and the anode target 6 at high voltage. In the case of placing the anode target 6 at the earth potential and the cathode portion 7 at a negative high voltage level, or in the case of setting the anode target 6 at +60 to +65 kV and the cathode portion 7 at −60 to −65 kV, making a neutral earthing, it is necessary to insulate between the cathode portion 7 and the rotor 32. This is because otherwise discharge would occur since the rotor 32 and the vacuum vessel 1 are close to each other. In this construction, since the portion where insulation should be made against a high voltage is only the anode target 6, it is possible to stabilize performance and attain the reduction of cost.

An electric insulator 33 is attached to a side plate 1c of the vacuum vessel 1, then an annular cooling ring 94 is attached to the insulator 33, and the anode target 6 is attached to the ring 94. The anode target 6 is fixed at an incline so that the X-ray 26 faces toward the subject 3. Since the electric insulator 33 is mounted to the side plate 1c in a position where a reinforcing beam 84 for preventing an atmospheric deformation of the side plate is present, the position of the anode target 6 is not influenced by the atmospheric pressure, thus permitting generation of a highly accurate rotary X-ray. The interior of the cooling ring 94 is filled with a cooling medium which is superior in electrical insulation property. The cooling medium absorbs the heat of the anode target 6, then passes through a coolant pipe (not shown) and is heat-exchanged by means of a radiator (not shown) which is mounted outside the vacuum vessel 1, thereafter returns to the cooling ring 94. The coolant pipe is also formed by a material superior in electrical insulation property.

Filament 34 for generating thermoelectrons is disposed in the interior of the cathode portion 7, constituting an electronic lens for converging the generated electrons onto the focal point 25 of the anode target 6. Since the filament 34 has a life span such that it will become finer due to vacuum evaporation and finally break, a consideration is given to permit easy replacement of the cathode portion 7. More specifically, a flange (not shown) is provided in a position of a side plate 1c corresponding to the cathode portion 7 to permit replacement of the cathode portion 7 without removal of the entire side plate 1c. Further, to maintain a rotational balance, plural cathode portions of the same shape are disposed so that in the event of disconnection of one filament, connection can be changed to supply an electric current to another filament.

AS shown in FIG. 3, the rotary member 28 divides the interior of the vacuum vessel 1 into two portions, in one of which are disposed the X-ray generating cathode portion 7 and anode target 6, while in the other there are disposed the power generating portion 35 and power conducting portion 38 involving the evolution of gas. Therefore, it is possible to maintain the cathode portion 7 and anode target 6 in a state of high vacuum. This is made more effective by the arrangement on the side of the cathode portion 7 of a vacuum pump 5 and the anode target 6. The vacuum pump 5 is disposed in a position which does not interfere with the subject 3 at the time of tilting. An additional vacuum pump may be disposed on the side of the power generating portion 35, etc. Since the rotary member 28 is fabricated of an electrically conductive material such as aluminum, it is possible to prevent the occurrence of discharge between the anode target 6 which is brought into the state of high voltage and the power generating portion 35, etc., whereby a stable X-ray can be obtained.

As shown in FIG. 2, the power conducting portion 38 comprises power conducting cathodes 91 each constituted by a tungsten strand of 0.22 mm dia. by 28 mm long and disposed in several positions throughout the whole circumference in the vacuum vessel 1, and a power conducting anode 92 of 3.5 mm in radius which is disposed in a surrounding relation to the power conducting cathodes 91 throughout the whole circumference of the vessel 1. The power conducting cathodes 91 have a power conducting filament (not shown) which is heated by an external power supply 93, whereby thermoelectrons are emitted from the power conducting cathode 91. The power conducting anode 92 is as large as 1 m or so in diameter and since a thermal expansion with the rise of temperature caused by electron impingement and radiation from the power conducting filament is not negligible, the anode 92 is constituted in a divided manner, not as an integral body. Further, the power conducting anode 92 has a black coating on the surface thereof to permit easy escape of heat radiationwise to the vacuum vessel 1 side. As the power conducting filament there usually is employed a thermoelectron emitting material such as, for example, tungsten or thoriated tungsten, but no special limitation is placed thereon if only the material used is an electron emitting source.

Since the power conducting anode 92 levitates in vacuum, the perveance between the power conducting cathodes 91 and the power conducting anode 92 is set 100 times or more as high as the perveance between the cathode portion 7 and the anode target 6, and operation is performed in a space charge limited range, it is possible to suppress the potential of the anode 92, namely, the potential of the rotating portion, to a value of below several hundred volts. Consequently, not only it is possible to suppress a vacuum discharge between adjacent vacuum vessel 1 and the rotor 32, but also it is possible to diminish the variation in a potential difference applied between each cathode portion 7 and anode target 6, whereby a good image quality can be obtained. Further, the generation of heat of the power conducting anode 92 caused by electronic shock can be prevented. In this embodiment wherein the power conducting cathodes 91 and anode 92 are constructed and arranged in the foregoing manner, a potential difference between the two was 180 V and a conduction current was 200 mA.

Several tens of power generating coils 37 are fixed to the rotary member 28 at equal pitches throughout the whole circumference and are connected to the filaments 34. Several electromagnets 36 are fixed each through a flange 95 to a side plate 1c of the vacuum vessel 1 in positions corresponding to the power generating coils 37. The power generating portion 35 is constituted by each electromagnet 36 and power generating coil 37. The coils 37 are each disposed in such a manner as to pass between pole pieces of the associated electromagnet 36, and with rotation of the rotary member 28, the coils 37 traverse the magnetic fields of the electromagnets 36 to generate electric power. A yoke portion of each electromagnet 36 is vacuum-sealed and extends through the flange 95, and a coil portion thereof is placed in the air. Thus, consideration is given so that the release of gas due to the generation of heat during energization of the coil is performed in the air.

Thus, the magnetic fields to be imparted to the power generating coils 37 are created by only the electromagnets 36 without the aid of permanent magnets. In a power generation system using permanent magnets in combination with electromagnets, the generation of heat caused by an eddy current can be controlled by only the number of revolutions of the rotary member 28, so that the rise of temperature in vacuum causes the evolution of gas and hence the resulting X-ray is not stable. This is undesirable. On the other hand, in the power generation system using only the electromagnets 36, by making electric currents in the electromagnets 36 opposite to each other in the direction of flow, it is made possible to allow filaments not to turn on, allowing only the power generating coils 37 to exhibit a rise in temperature due to an eddy current, thereby permitting promotion of vacuum exhaust.

In order to keep the intensity of the resulting X-ray 26 constant, it is necessary to detect an electric current flowing between the cathode portion 7 and the anode target 6 and make it constant. In this end, it is effective to adjust the voltage generated in each power generating coil 37 and thereby to control the electric current in the filament 34. Adjustment of the voltage generated in the coil 37 can be made by detecting an AC magnetic field induced by the electric current in the coil 37 and then making it constant, using Hall element (a magnetic field detecting element, not shown) provided on the plane through which the coil 37 passes. Particularly, since the coil 37 is placed in vacuum, it is not cooled with air, and hence the coil 37 exhibits a large increase of its temperature due to the generation of heat induced by electric resistance or eddy current. Such a rise of temperature increases the electric resistance of the filament 34, diminishes the electric current in the filament and decreases the intensity of the X-ray 26, the Hall element is very effective in obtaining a stable X-ray 26.

Since all that is required for the electromagnets 36 is that the electromagnets should be disposed within and fixed to the vacuum vessel 1, it is also possible to let the magnets 30 for magnetic levitation function as the electromagnets 36.

As shown in FIG. 3, the magnetic levitation magnets 30 are disposed within the vacuum vessel 1. Therefore, the magnets 30 and the objects 29 to be attracted can be opposed to each other directly not through the wall of the vessel 1, so that the gap between the two becomes smaller. Consequently, it is no longer necessary for the magnets 30 to be strong, and their size and weight and power consumption are reduced. For avoiding atmospheric deformations of the vacuum vessel 1, the magnets 30 are attached to the inner plates 61 which are separated mechanically from the vessel 1. Further, one end of each of the inner plates 61 extend toward the rotary member 28 to provide a vacuum separation structure so that the gas generated from the magnets 30 may not move toward the anode target 6 and the cathode portions 7. The inner plates 61 are formed of a material having a high magnetic permeability so that thermoelectrons from the cathode portions 7 may not be deflected by the magnetic field leaking from the magnets 30.

The opposed faces of each object 29 to be attracted and magnetic levitation magnet 30 are both inclined 45° relative to the rotational axis a. Therefore, with only one magnet 30, it is possible to move the rotary member 28 in both the direction of the axis a and the direction perpendicular thereto, that is, it is no longer required to use magnetic levitation magnets respectively for movement in the rotational axis a direction and movement in the direction perpendicular thereto.

As shown in FIG. 3, the objects 29 to be attracted are fixed to the connection between the rotary member 28 and the rotor 32. The rotary member 28 and the rotor 32 are formed of a material low in rigidity such as aluminum for example and so the objects 29 to be attracted play the role of reinforcing the rotary member 28 and the rotor 32. Further, a rotor-back yoke 32a present at the back of the rotor 32 is integral with each object 29 to be attracted.

Figure 4A:
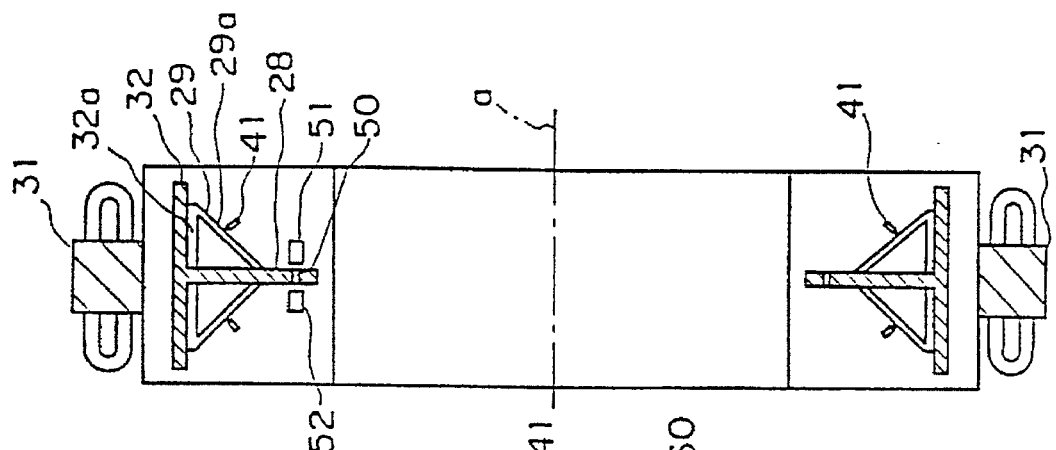
FIG. 4 is a detailed view of the rotary cathode X-ray tube equipment shown in FIG. 2.
Figure 4B:
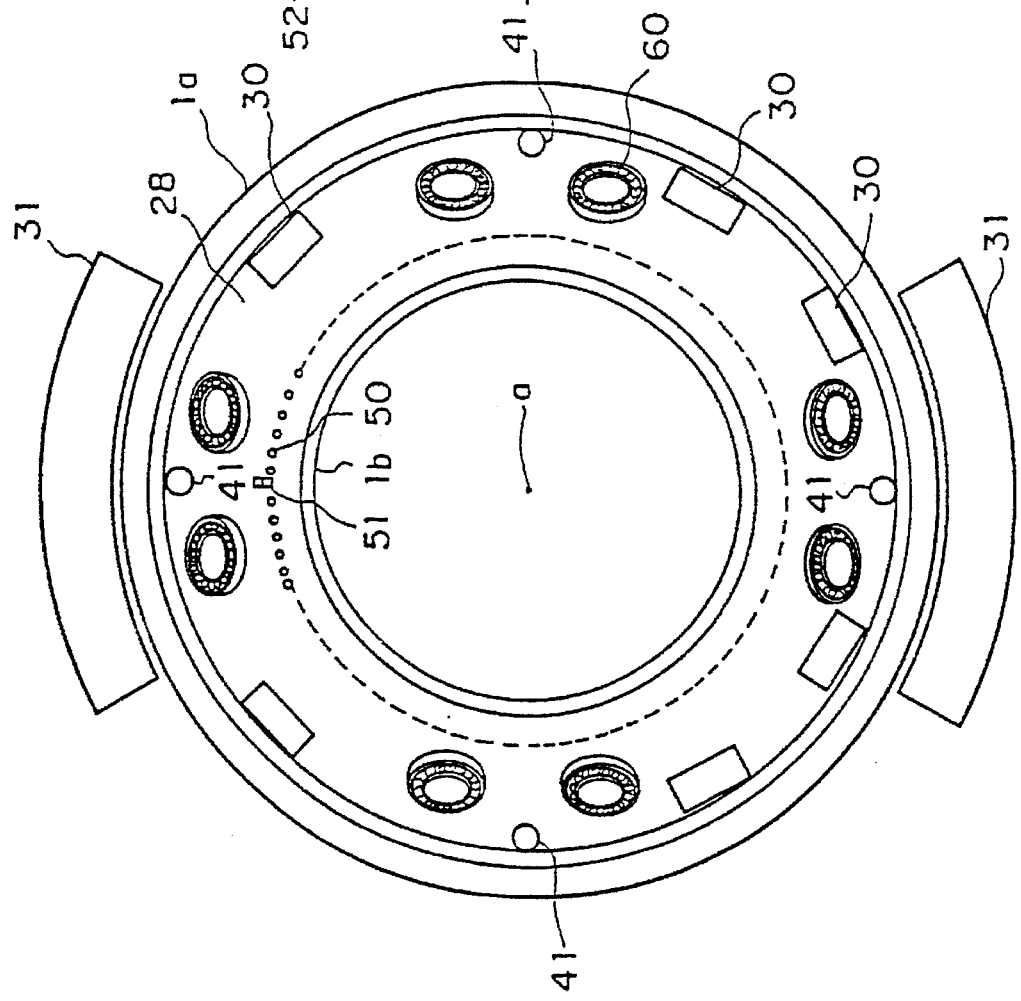

As shown in FIG. 4(b), it is not that a single magnet 30 for magnetic levitation is provided throughout the whole circumference, but there are used a total of twelve such magnets 30 in a divided manner. As a result, each magnet 30 becomes smaller in size and so is easier to handle.

Figures 9A, 9B:
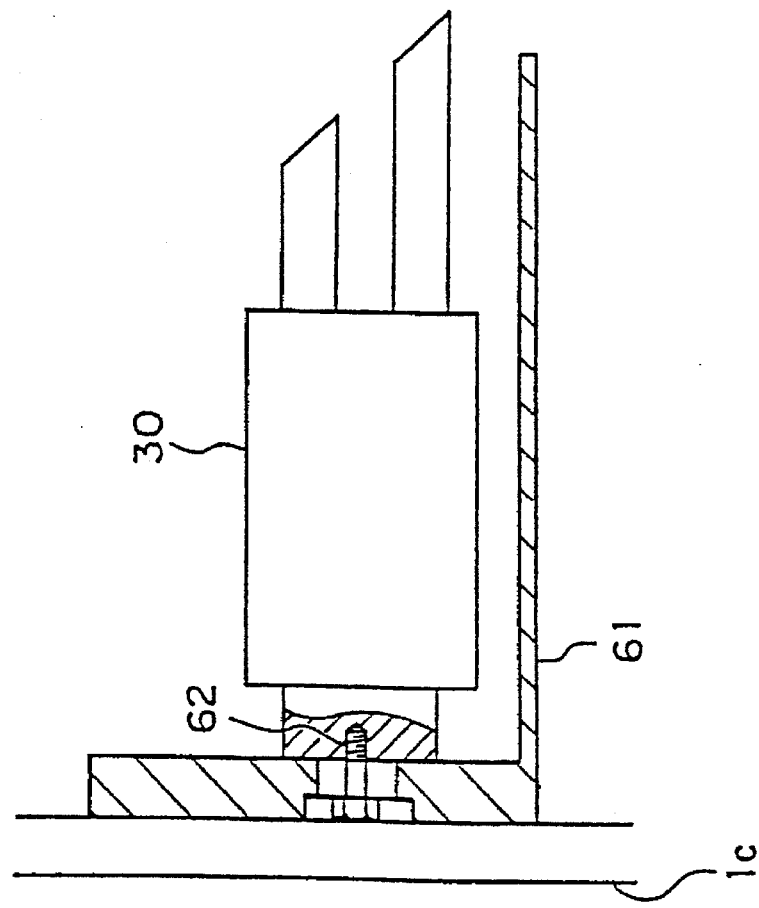
FIG. 9 is a construction diagram showing in what manner a magnet for magnetic levitation is mounted.

The mounting positions of the magnetic levitation magnets 30 can be finely adjusted. More specifically, in mounting the magnets 30, all the magnets 30 are first attached to the inner plates 61 with bolts 62, as shown in FIG. 9(a). In this case, there are used mounting holes 63, which are vertically long as shown in FIG. 9(b) and which permit fine adjustment of the mounting position of each magnet 30, thereby permitting fine adjustment of the gap between the magnet 30 and the associated object 29 to be attracted. The inner plates have been subjected to spot facing to receive the heads of the bolts 62 therein. After the end of mounting of all the magnets 30 for magnetic levitation, the inner plates 61 are fixed to the side plates 1c of the vacuum vessel 1.

As shown in FIG. 4(b), the number of the magnets 30 is larger (eight in all) in the lower portion and smaller (four in all) in the upper portion. This is because the attraction component of the magnets 30 disposed in lower positions face in a direction to pull up the rotary member 28 against gravity, while the attraction component of the magnets 30 disposed in upper positions face in a direction (same as the gravitational direction) to pull down the rotary member 28. Particularly, for magnetic levitation of such a heavy object as the rotary member 28, such difference in the number of magnets 30 is very effective.

Although in FIG. 3 both yoke and coil portions 30a, 30b of the magnetic levitation magnets 30 are disposed within the vacuum vessel 1, there may be adopted a construction in which only the yoke portions 30a are disposed within the vacuum vessel 1 and the coil portions 30b disposed outside the vessel 1. Since the coil portions 30b evolve gas, it is possible to improve the degree of vacuum of the vacuum vessel 1.

FIG. 4(a) and 4(b) are detailed views of the rotary cathode X-ray tube equipment shown in FIG. 2, in which FIG. 4(a) is a front view and FIG. 4(b) is a side view. There are constructional elements which are not shown in FIGS. 4(a) and 4(b) though shown in FIGS. 2 and 3. In FIGS. 4(a) and(b), a total of eight non-contact displacement meters 41 are disposed in close proximity to slant faces 29a of the objects 29 to be attracted. The non-contact displacement meters 41 are for detecting positions of the objects 29 and thereby detecting the state of magnetic levitation of the rotary member 28. Detected signals from the meters 41 are processed by a magnet control circuit 53 (see FIG. 5) to control the magnets 30. Thus, the non-contact displacement meters 41 measure displacements of the slant faces 29a and hence the position of the rotary member 28 in the rotational axis a direction and the position thereof in the direction perpendicular thereto can be detected by one displacement meter 41; that is, it is not necessary to provide non-contact displacement meters respectively for the measurement in the rotational axis a direction and for the measurement in the direction perpendicular thereto. The side plates 1c of the vacuum vessel 1 are formed with lead wire passing portions 42 (see FIG. 5).

The non-contact displacement meters 41 can be mounted to the inner plates 61, whereby it is made possible to facilitate fine adjustment of the mounting positions of the meters 41.

As shown in FIG. 4(b), touch-down bearings 60 are disposed so as to have a different central axis than the rotational axis a of the rotary member and thus they are different from the conventional touch-down bearings (see those indicated at 14 and 20 in FIG. 1). Since the rotary cathode X-ray tube equipment has a large subject insertion hole 4 formed centrally, the conventional arrangement requires using touch-down bearings of a large diameter. Although it is necessary to use a large number (16 in this embodiment) of touch-down bearings 60, as shown in FIG. 4, there can be attained reduction in size, weight and cost as compared with using one or two bearings of a large diameter. The function of the touch-down bearings 60 is the same as in the prior art; that is, they function to support the rotary member 28 when the power source of the magnetic levitation mechanism has been turned off.

The touch-down bearings 60 can be mounted to the inner plates 61, whereby it is made possible to facilitate fine adjustment of the mounting positions of the bearings 60.

Figure 6:
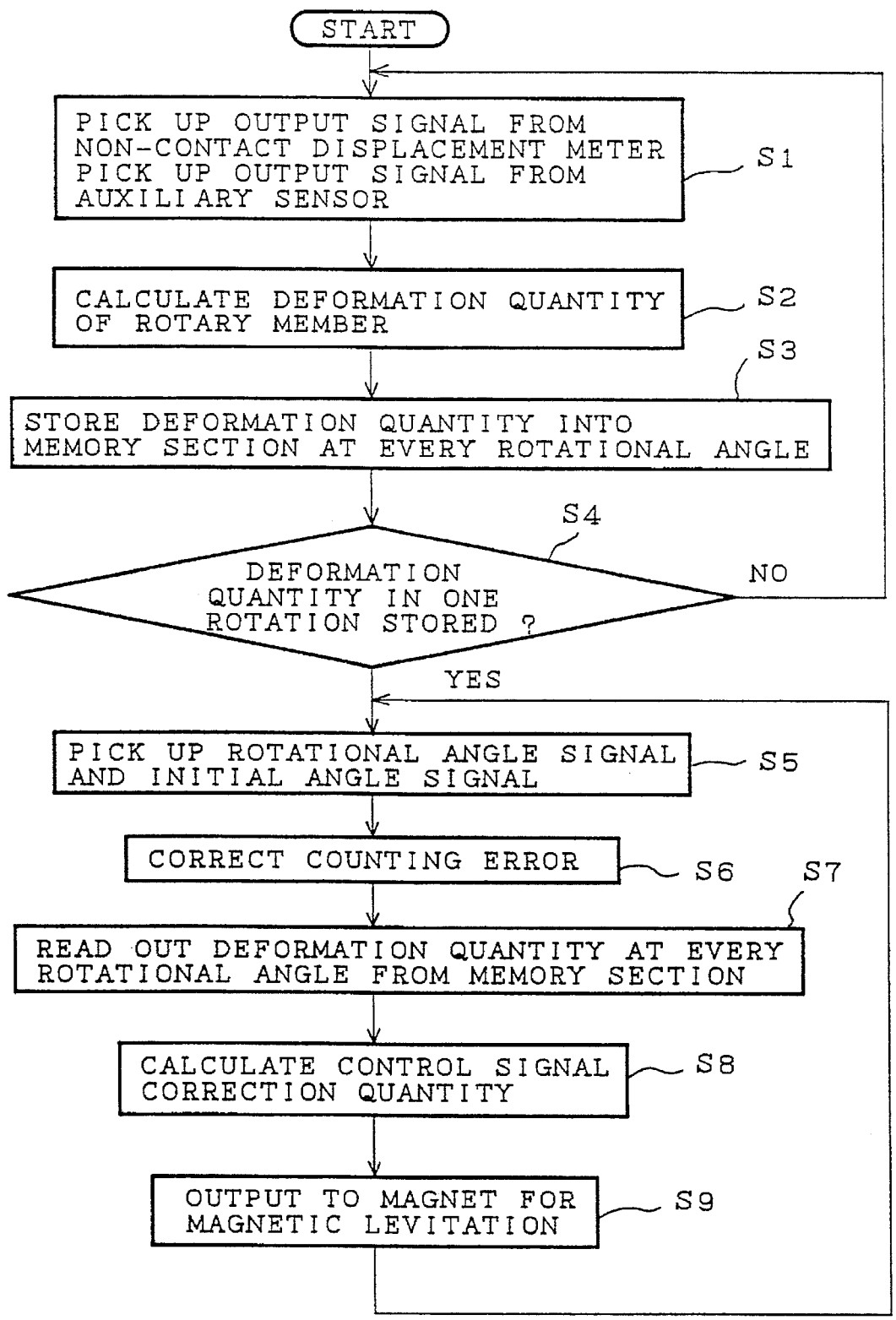
FIG. 6 is a flowchart showing operations of a deformation correcting circuit.

FIG. 6 is a flowchart showing operations of a deformation correcting circuit for correcting deformations of the rotary member 28 caused by machining errors, gravitational deformations, etc. Prior to performing the operations shown in this flowchart, a jig (not shown) having a centroid indicating point which indicates a centroid position of the rotary member 28 is mounted centrally of the rotary member. This jig is mounted after removal of the inner ring 1b of the vacuum vessel 1. Further mounted is an auxiliary sensor (not shown) for detecting the position of the centroid indicating point.

Reference will now be made to operations of steps $S_1$ to $S_4$ which are performed prior to operation (coaxial tomography obtaining operation) of the rotary cathode X-ray tube equipment for obtaining a coaxial tomography of the subject. First, an output signal $A_1$ from the non-contact displacement meters 41 and an output signal $A_2$ from the above auxiliary sensor are taken in (step $S_1$). The output signal $A_1$ contains a deformation quantity of the rotary member 28, while the output signal $A_2$ does not contain such deformation quantity. Therefore, the deformation quantity can be calculated by subtraction between both output signals (step $S_2$). This deformation quantity is stored in the memory portion of RAM for example (step $S_3$). Then, the operations of steps $S_1$ to $S_3$ are performed while the rotary member 28 is turned stepwise, say, 1° at a time, and a deformation quantity in one rotation is stored (step $S_4$). Thereafter, the jig and the auxiliary sensor are removed.

Figure 7:
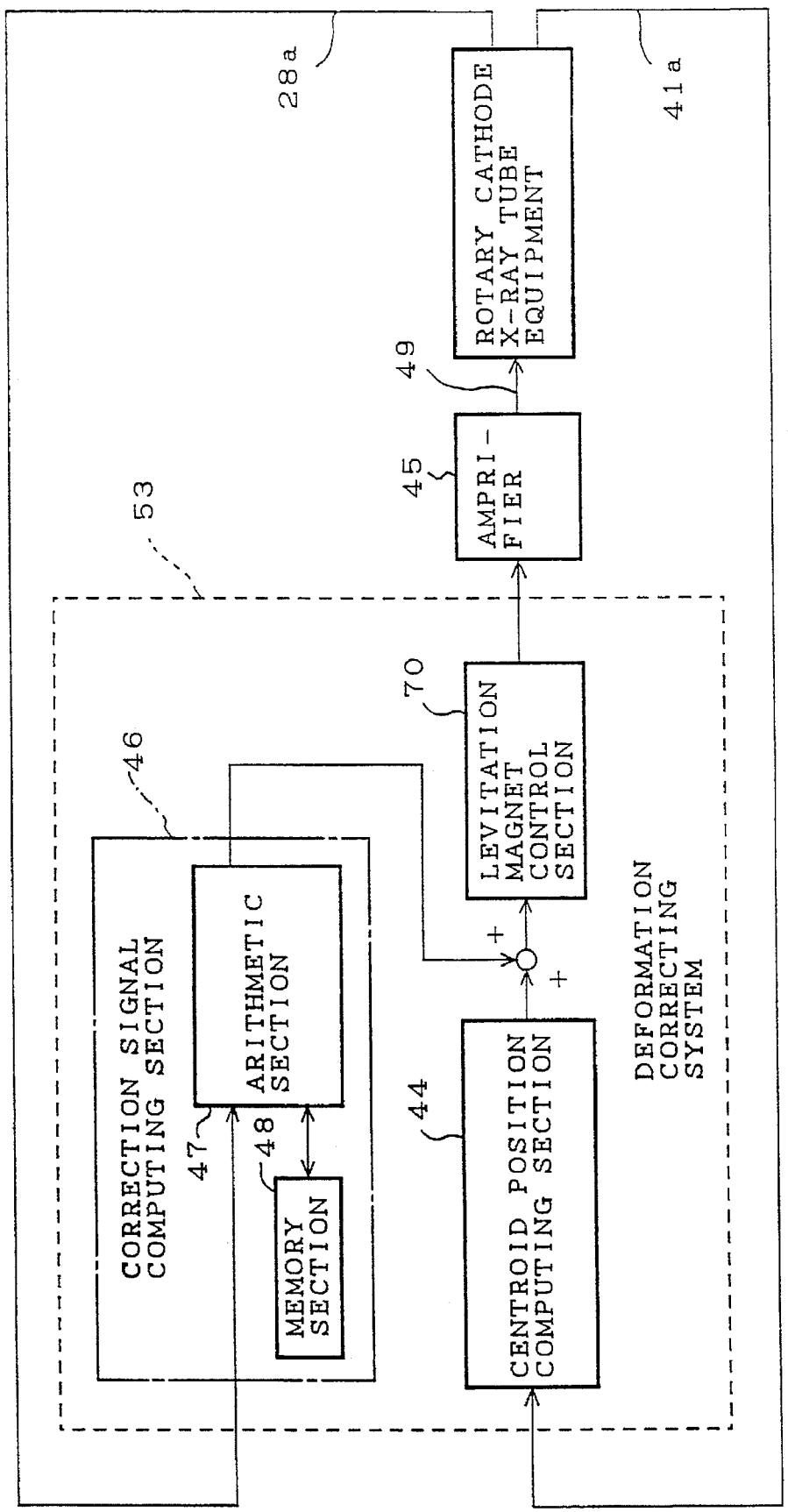
FIG. 7 is a block diagram showing a construction of the deformation correcting circuit.

Next, the operation flow shifts to a coaxial tomography obtaining operation comprising steps $S_5$ to $S_9$. This operation is carried out by the deformation correcting circuit 53 shown in FIG. 7. First, a rotational angle signal 28a indicating a rotational angle of the rotary member 28 is taken in from a rotational angle detecting means, or an encoder which will be described later, (step $S_5$). Since there is the possibility that the encoder will make a mistake in counting, this counting error is corrected by an initial angle signal which is generated one per rotation of the rotary member 28 (steps $S_5$ and $S_6$). In this way there is obtained an accurate rotational angle of the rotary member 28, so a deformation quantity corresponding to the rotational angle is accessed from a memory section 48 (step $S_7$). This deformation quantity is converted to a control signal correcting quantity for the magnetic levitation magnets 30 by means of an arithmetic section 47 (step $S_8$). The said control signal correcting quantity is added to an output signal of a centroid position computing section 44, which signal is then outputted to a levitation magnet control section 70 (step $S_9$). Further, an output signal from the control section 70 is amplified by an amplifier 45 and then fed to the magnetic levitation magnets 30.

As shown in FIGS. 2 and 4, the stators 31 are disposed outside the outer ring 1a of the vacuum vessel 1, that is, on the side opposite to the subject insertion hole 4 with respect to the vessel 1. This arrangement is advantageous in the following points in comparison with the conventional arrangement in which the stators are disposed on the side plates 1c of the vessel 1. The thickness (distance b in FIG. 2) of the rotary cathode X-ray tube equipment can be made small and hence it is possible to enlarge the movable range (an angular range which permits rotation of the rotary cathode X-ray tube equipment around the subject 3) of the tilting mechanism 71 (see FIG. 10). On the other hand, even in comparison with the case where the stators are disposed on the inner ring 1b of the vacuum vessel 1, the subject insertion hole 4 is larger and therefore it is possible to inspect even a large subject 3; besides, the movable range of the tilting mechanism 71 becomes wider. It is also possible to enlarge the whole machine while maintaining the subject insertion hole 4 and dispose the stators inside the inner ring 1b, but since the X-ray generating position assumes an outside position, there occur drawbacks such as, for example, a poor utilization efficiency of X-ray.

The shape of the stators 31 is not circular, unlike the conventional shape, but is arcuate as in FIG. 4(b). Together with the rotor 32 in the vacuum vessel 1, the stators 31 constitute a linear induction motor. In consideration of controlling the levitation of the rotary member 28 and in order to prevent its rotational center from becoming eccentric, it is necessary that the stators 31 be disposed in two or more positions (two in the vertical direction) at equal intervals.

As shown in FIG. 3, the thickness of the outer ring 1a is smaller in the portion where the yoke part of each stator 31 is positioned than in the portion where such yoke part is not present. As a result, the driving force of the motor can be increased at the thinner portion while retaining a required strength at the thicker portion.

As shown in FIG. 4(b), a plurality of detection holes 50 are formed in the rotary member 28, and as shown in FIG. 4(a), a light emitter 51 and a photosensor 52 are disposed on both sides of the detection holes 50. When a detection hole 50 arrives at the spacing between the light emitter 51 and the photosensor 52 in accordance with the rotational angle of the rotary member 28, the light from the light emitter 51 reaches the photosensor 52, while when no detection hole 50 is present in the spacing, the light from the light emitter 51 does not reach the photosensor 52. By processing an output signal provided from the photosensor 52, it is made possible to detect a rotational angle of the rotary member 28 from its initial position or a rotating speed thereof. Thus, the detection holes 50, light emitter 51 and photosensor 52 constitute a large encoder centered on the rotational axis a of the rotary member 28. The detection accuracy thereof is very high because of a large distance from the axis a to each detection hole 50, and the reliability is also high because it is a non-contact type.

Figure 5:
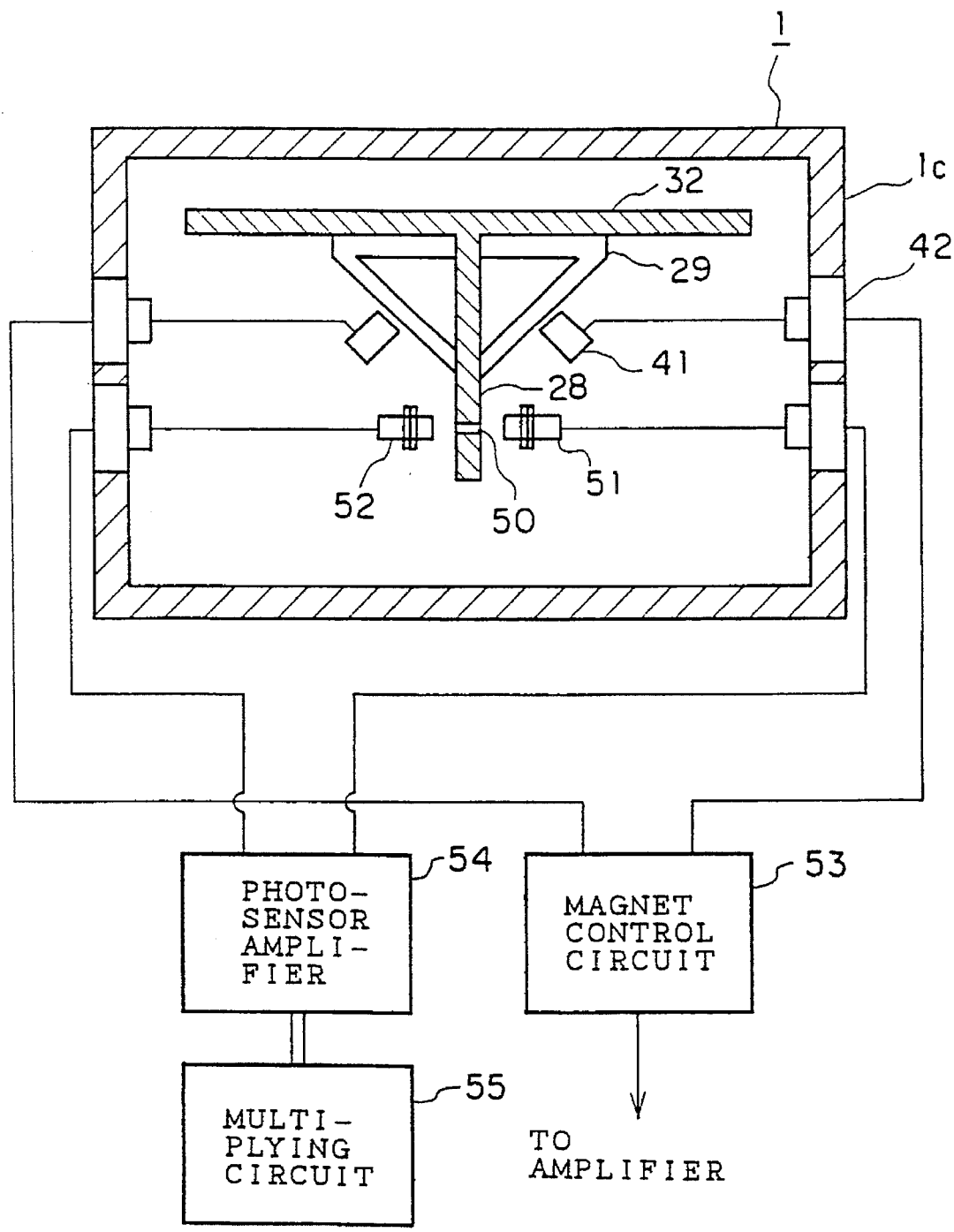
FIG. 5 is a construction diagram schematically showing in what manner an output signal from a detector is processed.
Figure 8:
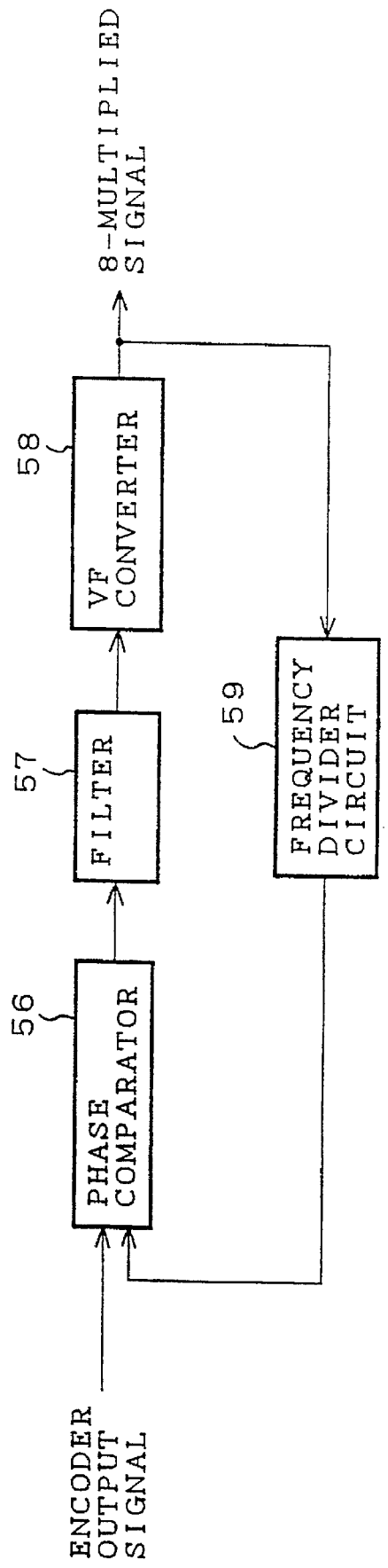
FIG. 8 is a block diagram showing the details of a multiplying circuit.

As shown in FIG. 5, an output signal from the above encoder is amplified by a photosensor amplifier 54 and is then eight-multiplied by a multiplying circuit 55. FIG. 8 is a block diagram showing the details of the multiplying circuit 55. The output signal from the encoder is first fed to a phase comparator 56, which in turn outputs a voltage proportional to a phase difference between two input signals. An output signal from the phase comparator 56 is filtered by means of a filter 57 and thereafter converted to a pulse having a frequency proportion to the voltage by means of a VF converter 58.

Since the gain of the phase comparator 56, etc. is adjusted properly, the said pulse has an eight-multiplied frequency with respect to the encoder output signal. This eight-multiplied signal is fed to a frequency divider circuit 59, which in turn outputs one pulse at every counting of eight pulses. Consequently, the output pulse from the frequency divider circuit 59 comes to have a frequency equal to that of the encoder output signal. This output pulse is fed back to the phase comparator 56, which in turn outputs a voltage proportional to a phase difference between the encoder output signal and the output signal from the frequency divider circuit 59, thereby resulting in that the ratio between the frequency of the encoder output signal and that of the eight-multiplied signal becomes just 8.

Embodiment 2

Although in embodiment 1 the attracting force in the direction to pull up the rotary member 28 is increased by differentiating the number of the magnetic levitation magnets 30, the same effect can be attained also by increasing the size of the magnets 30 disposed in the lower portion.

Embodiment 3

Figure 10:
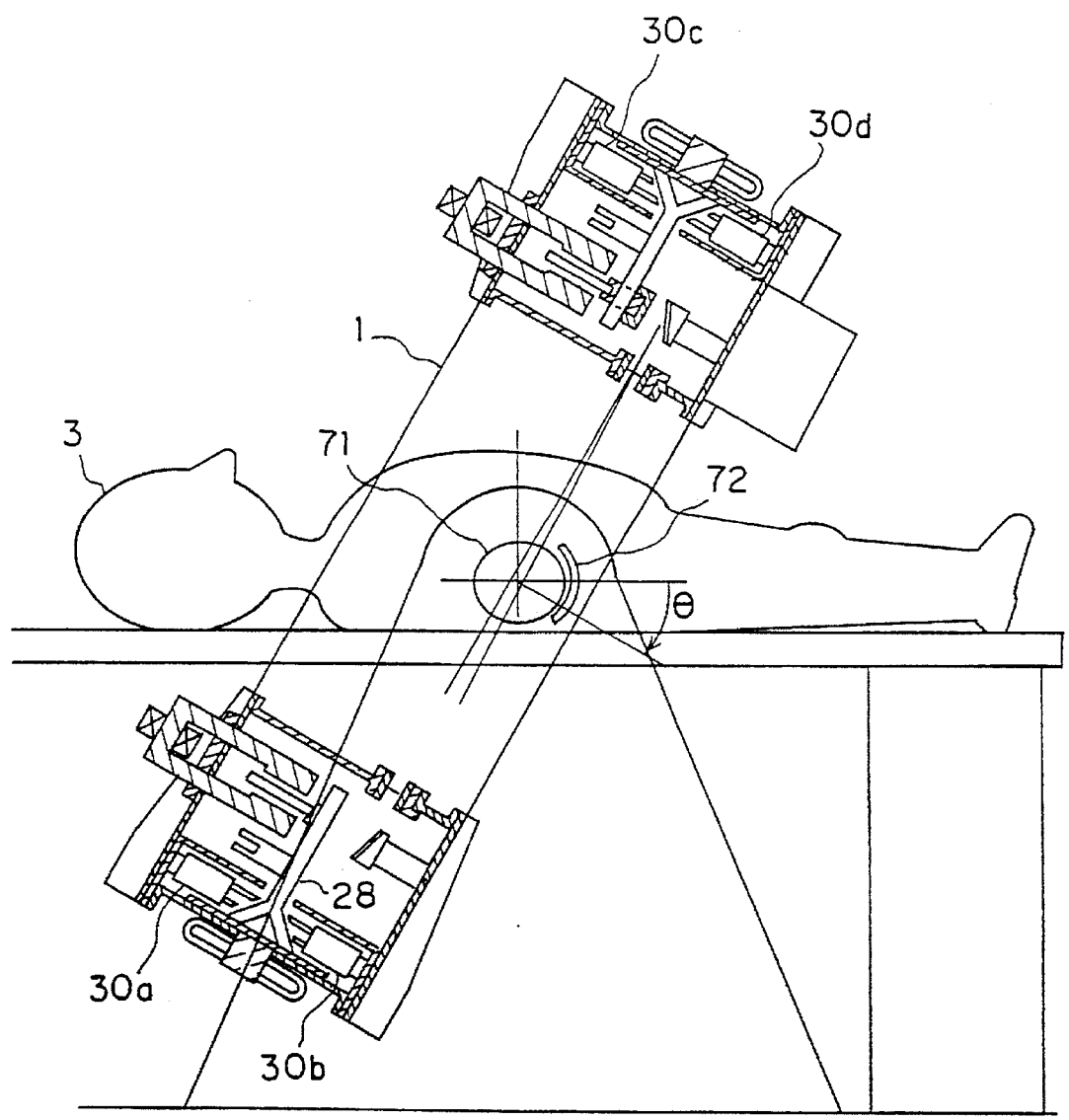
FIG. 10 is an explanatory view of embodiment 3 of the present invention.

An X-ray CT equipment is usually provided with the tilting mechanism 71 for tilting an X-ray generating mechanism (the vacuum vessel 1 in the rotary cathode X-ray tube equipment of the present invention) with respect to the subject 3, as shown in FIG. 10. When the vacuum vessel 1 tilts, the rotary member 28 accommodated in the vessel also tilts, so the attractive force to be generated by each magnetic levitation magnet must vary.

More specifically, when an inclination angle θ is 0, the attractive force to be generated by a magnet 30a for magnetic levitation and that by a magnet 30b for magnetic levitation are the same, and the attractive forces to be generated by magnetic levitation magnets 30c and 30d are the same. However, when the inclination angle θ increases into such a state as shown in FIG. 10, the attractive force to be generated by the magnet 30a is required to be larger than that to be generated by the magnet 30b; likewise, the attractive force to be generated by the magnet 30c must be larger than that to be generated by the magnet 30d. Such variations in attraction causes variations in the electric current supplied to each magnet 30 for magnetic levitation, thus sometimes causing the control for the magnetic levitation mechanism become unstable.

Figure 11:
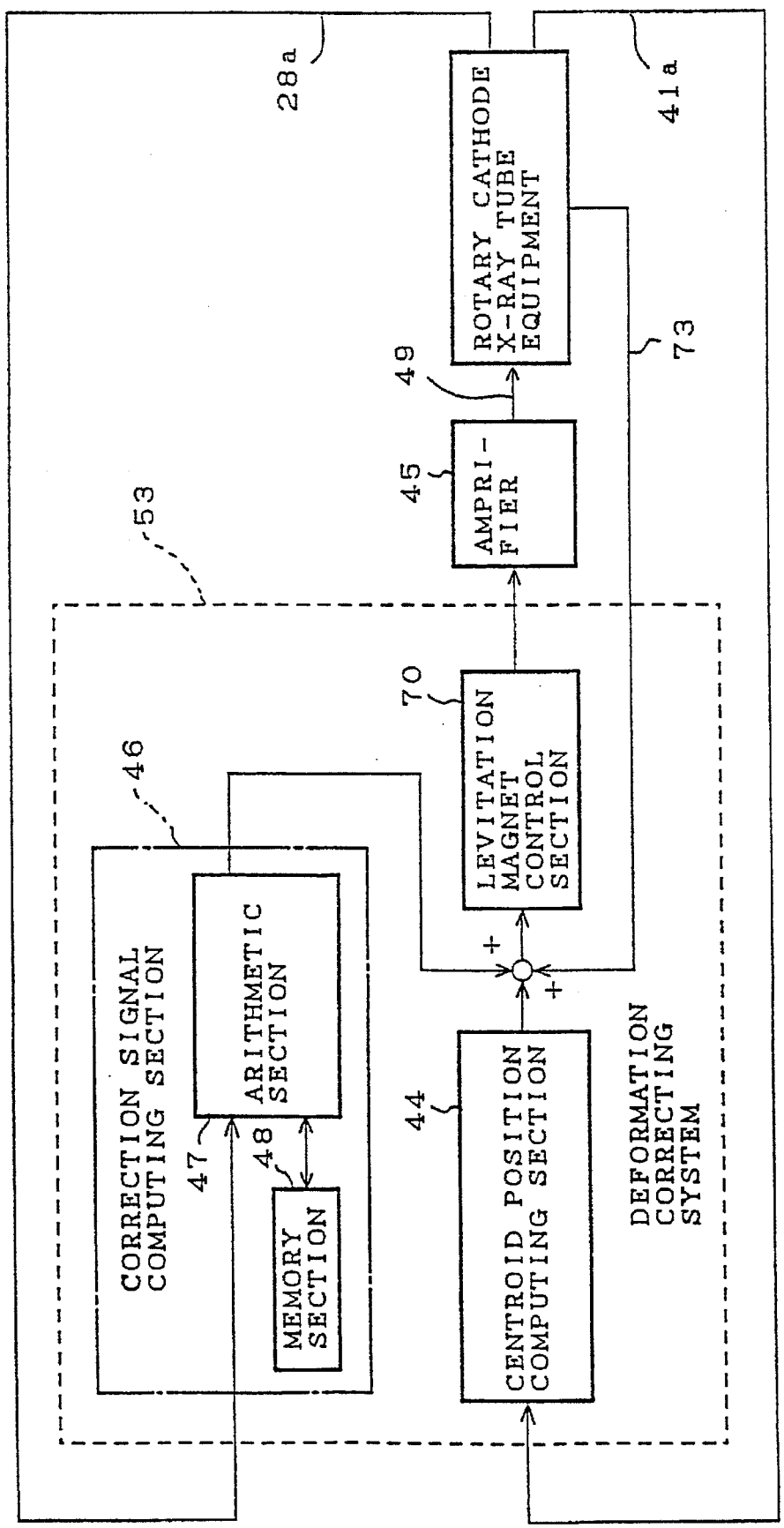
FIG. 11 is a block diagram showing a construction of embodiment 3 of the present invention.

Such unstabilization problem is solved by increasing the attractive force of the magnetic levitation magnet 30a which is disposed so a that its attractive force component is enhanced for pulling up the rotary member 28 against gravity. More specifically, an inclination angle sensor 72, e.g. encoder, for detecting an inclination angle θ is disposed near the tilting mechanism 71 so that an inclination angle signal 73 indicating the inclination angle θ is inputted to the levitation magnet control section 70, as shown in FIG. 11. The control section 70 outputs to the amplifier 45 an electric current control signal with a bias proportional to the inclination angle θ added thereto. In this way it becomes possible to stably control the attractive force of each magnet 30 for magnetic levitation.

As shown in FIG. 10, the rotational axis of the tilting mechanism 71 is disposed in a deviated state so that the centroid position of the portion (vacuum vessel 1, etc.) which is tilted by the tilting mechanism 71 is neither vertically below the rotational axis of the tilting mechanism nor on the rotational axis. Consequently, the gravity which works on the vacuum vessel 1, etc. imparts a unidirectional torque of a certain value or more to the drive source of the tilting mechanism 71. By so doing, it is made possible to prevent the vacuum vessel 1, etc. from being oscillated about the rotational axis by a reaction of the attractive force to the magnetic levitation magnets 30.

Embodiment 4

Figure 12:
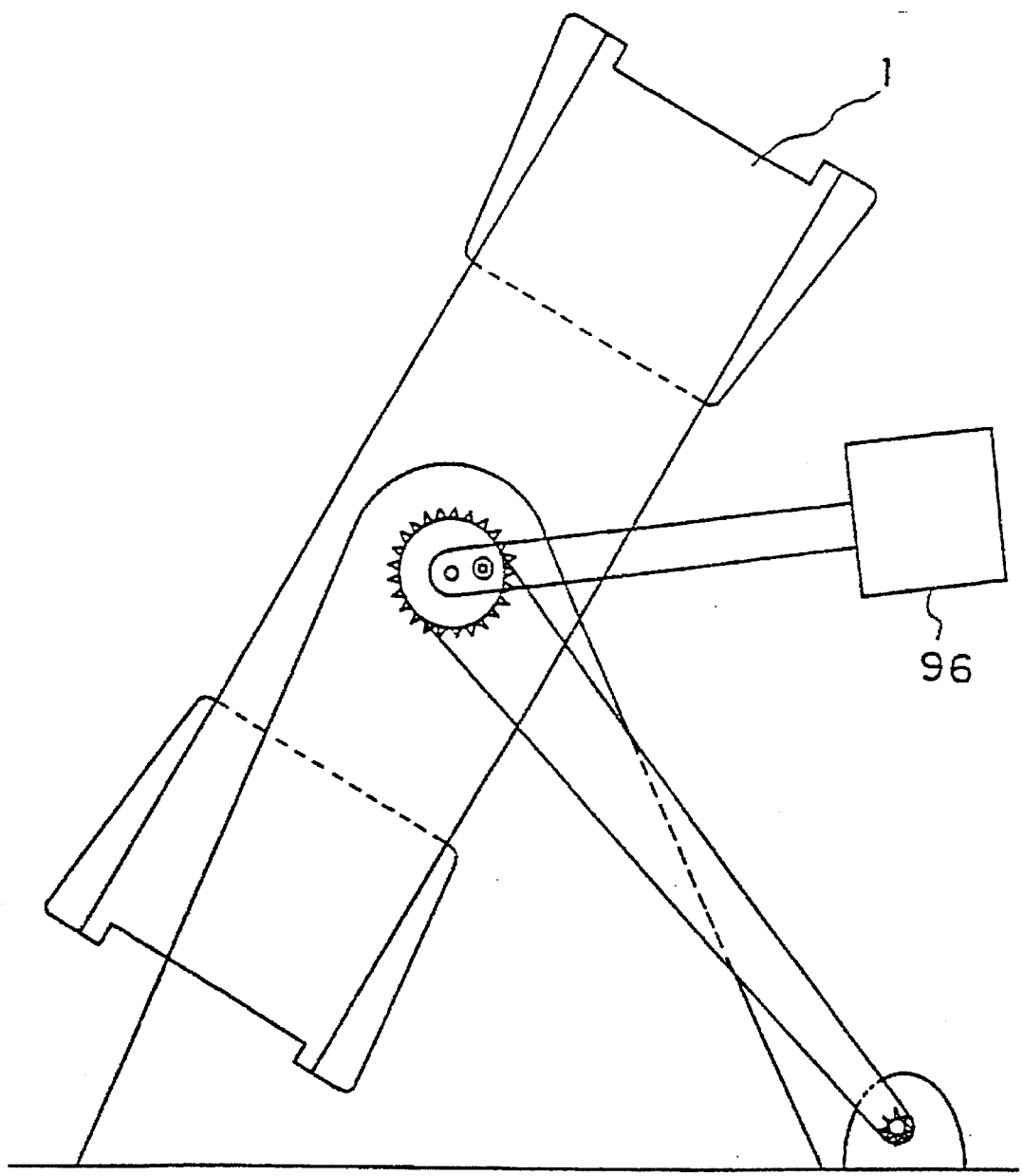
FIG. 12 is a construction diagram schematically showing embodiment 4 of the present invention.

As shown in FIG. 12, the same effect as that mentioned in the latter half portion of embodiment 3 can be obtained also by attaching a weight 96 to the portion which is tilted by the tilting mechanism 71 to let a unidirectional torque of a certain value or more act on a tilting motor 97 through a chain 98.

According to the rotary cathode X-ray tube equipment in the first aspect of the present invention, since the equipment is provided with a joint portion disposed between an X-ray radiation window and an inner ring and having both a surface perpendicular to a rotational axis of a rotary member and a cylindrical surface parallel to the rotational axis, the equipment is further provided with a face seal formed on the surface perpendicular to the rotational axis of the joint portion and an axial seal formed on the cylindrical surface parallel to the rotational axis. Therefore, the X-ray radiation window which is low in strength is not influenced by atmospheric deformations of the vacuum vessel or machining and assembling errors.

According to the rotary cathode X-ray tube equipment in the second aspect of the present invention, since the anode target is set at a high potential, with the cathode portion at a potential close to the earth potential, it is possible to prevent discharge between the rotor and the vacuum vessel. Additionally, since it is only the anode target 6 that should be insulated with respect to a high voltage, it is possible to stabilize performance and attain the reduction of cost.

According to the rotary cathode X-ray tube equipment in the third aspect of the present invention, since the equipment is provided with a shielding plate made of an electroconductive material and disposed between the anode target as well as the cathode portion and the filament current supply means as well as the power conducting portion, it is possible to prevent gas generated in the filament current supply means and the power conducting portion from moving toward the anode target and the cathode portion and thereby keep the anode target and the cathode portion in high vacuum. It is also possible to prevent the occurrence of discharge between the filament current supply means as well as the power conducting portion and the anode target as well as the cathode portion.

According to the rotary cathode X-ray tube equipment in the fourth aspect of the present invention, the equipment is provided with a power conducting anode fixed to the rotary member and connected to the cathode portion and also provided with a power conducting cathode fixed to the vacuum vessel and connected to one end of a high voltage power supply, and the perveance between the power conducting cathode and the power conducting anode is set 100 times or more as large as the perveance between the cathode portion and the anode target. Since the high voltage power supply and the cathode portion can be connected in a non-contact manner, there no longer is any fear of wear or dust, resulting in a prolonged service life of those components. Further, since it is possible to diminish variations in the potential difference between the cathode portion and the anode target, a good image quality can be obtained.

According to the rotary cathode X-ray tube equipment in the fifth aspect of the present invention, since the equipment is provided with an electromagnet fixed to the vacuum vessel and functioning to generate a magnetic field and also provided with a power generating coil connected to filament and adapted to rotate together with a rotary member and thereby pass across the magnetic field generated by the electromagnet, the supply of electric power to the filament can be done in a non-contact state and hence there is no longer any fear of wear or dust, resulting in a prolonged service life.

According to the rotary cathode X-ray tube equipment in the sixth aspect of the present invention, since the equipment is provided with a magnetic field detector fixed to the vacuum vessel for detecting a magnetic field created in a power generating coil by an electric current flowing through the same coil, the electric current fed to filament is made constant and it is thereby made possible to obtain a stable X-ray.

According to the rotary cathode X-ray tube equipment in the seventh aspect of the present invention, since a common magnet is used for both an electromagnet and a magnet for magnetic levitation, it is possible to reduce the number of parts used and hence attain the reduction of weight and cost.

According to the rotary cathode X-ray tube equipment in the eighth aspect of the present invention, since at least a portion of a magnet for magnetic levitation is disposed within the vacuum vessel, the magnetic levitation magnet and an object to be attracted can be opposed to each other without through the wall of the vacuum vessel and the gap between the two can be made smaller, so it is possible to reduce the size, weight and power consumption of the magnetic levitation magnet.

According to the rotary cathode X-ray tube equipment in the ninth aspect of the present invention, opposed faces of the magnetic levitation magnet and the object to be attracted are both inclined with respect to the rotational axis of the rotary member, and the attractive force of the magnetic levitation magnet involves both a component acting in the rotational axis direction and a component in the radial direction of the rotary member, so the magnetic levitation magnet can generate at a time both a force acting in the rotational axis direction of the rotary member and a force in the direction perpendicular thereto, whereby it is made possible to reduce the size, particularly the size in the rotational axis direction.

According to the rotary cathode X-ray tube equipment in the tenth aspect of the present invention, since the object to be attracted and the rotor are integral with each other, it is possible to attain the reduction of weight and cost.

According to the rotary cathode X-ray tube equipment in the eleventh aspect of the present invention, since there are provided a plurality of magnets for magnetic levitation, the size of each such magnet is reduced and hence it is possible to handle the magnet more easily.

According to the rotary cathode X-ray tube equipment in the twelfth aspect of the present invention, since the mounting position of each magnet for magnetic levitation is adjustable, the gap between the magnet and the object to be attracted can be adjusted in accordance with the mounting position of the magnet, so by mitigating the demand on machining accuracy for each magnetic levitation magnet it is made possible to facilitate the manufacture.

According to the rotary cathode X-ray tube equipment in the thirteenth aspect of the present invention, since plural magnets for magnetic levitation are provided and these magnets are attached to inner plates mounted to the vacuum vessel, the gap between each magnetic levitation magnet and the object to be attracted can be adjusted in accordance with the mounting position of the magnet, so by mitigating the demand on machining accuracy for the magnet it is made possible to facilitate the manufacture.

According to the rotary cathode X-ray tube equipment in the fourteenth aspect of the present invention, out of magnets for magnetic levitation, the size of one having an attractive force component positioned in a direction to pull up the rotary member against gravity is larger than that of one having an attractive force component positioned in a direction to pull down the rotary member, so the size of a magnet for magnetic levitation which is not required to generate a large attractive force is made smaller, whereby the entire efficiency can be improved.

According to the rotary cathode X-ray tube equipment in the fifteenths aspect of the present invention, out of the total member of magnets for magnetic levitation, the number of magnets having an attractive force component positioned in a direction to pull up the rotary member against gravity is larger than that of magnets having an attractive force component positioned in a direction to pull down the rotary member is larger, so by omitting the magnetic levitation magnets located in positions not requiring the generation of a large attractive force, it is made possible to improve the entire efficiency.

According to the rotary cathode X-ray tube equipment in the sixteenth aspect of the present invention, since the equipment is provided with an inclination angle detecting mechanism for detecting an inclination angle of the vacuum vessel and also provided with a levitation magnet control section for increasing and decreasing the attractive forces of magnetic levitation magnets in accordance with output signals of the inclination angle detecting mechanism, it is possible to reduce variations of electric current in the magnetic levitation magnets which occur upon inclination of the vacuum vessel relative to the subjects and hence it is possible to make a stable centroid position control.

According to the rotary cathode X-ray tube equipment in the seventeenth aspect of the present invention, since a front end of a yoke portion is disposed within the vacuum vessel, a coil portion which evolves gas can be disposed outside the vacuum vessel, whereby the degree of vacuum of the same vessel is improved.

According to the rotary cathode X-ray tube equipment in the eighteenth aspect of the present invention, since a non-contact type displacement meter measures a displacement of an inclined surface of the object to be attracted, it is possible to let the non-contact displacement meter function to detect both a levitation state of the rotary member and a position of the rotary member in the rotational axis direction, whereby the number of such displacement meters used can be decreased, thus permitting the reduction of size and cost.

According to the rotary cathode tube equipment in the nineteenth aspect of the present invention, since the non-contact displacement meters are attached to inner plates mounted to the vacuum vessel, it is easy to make a fine adjustment of the mounting position of each non-contact displacement meter.

According to the rotary cathode X-ray tube equipment in the twentieth aspect of the present invention, since the equipment is provided with at least one touch-down bearing whose central axis is separate from the rotational axis of the rotary member, it is not necessary to use a large-sized bearing and hence possible to attain the reduction of size, weight and cost.

According to the rotary cathode X-ray tube equipment in the twenty-first aspect of the present invention, since the mounting position of the touch-down bearing is adjustable, it is easy to make a fine adjustment of the mounting position of the touch-down bearing.

According to the rotary cathode X-ray tube equipment in the twenty-second aspect of the present invention, since the touch-down bearing is attached to an inner plate mounted to the vacuum vessel, it is easy to make a fine adjustment of the same bearing.

According to the rotary cathode X-ray tube equipment in the twenty-third aspect of the present invention, since within a movable range of a tilting mechanism a centroid position of a portion tilted by the tilting mechanism never assumes a position vertically below the rotational axis of the tilting mechanism and the centroid position is not coincident with the rotational axis of the tilting mechanism, it is possible to prevent the vacuum vessel, etc. from being oscillated about the rotational axis by a reaction of the attractive force of each magnetic levitation magnet.

According to the rotary cathode X-ray tube equipment in the twenty-fourth aspect of the present invention, since the equipment is provided with a torque applying device for applying torque which is always unidirectional to a rotative shaft of the tilting mechanism, the vacuum vessel, etc. can be prevented from being oscillated about the rotational axis by a reaction of the attractive force of each magnetic levitation magnet.

According to the rotary cathode X-ray tube equipment in the twenty-fifth aspect of the present invention, the equipment is provided with a rotational angle detecting means for detecting a rotational angle of the rotary member, a non-contact displacement meter for detecting a position of the rotary member, a memory section for storing a deformation quantity for each rotational angle of the rotary member, and a deformation correcting circuit for correcting a detected signal for each rotational angle of the rotary member on the basis of an output signal from the rotational angle detecting means and the deformation quantity, so by allowing a certain deformation of the rotary member which is easy to deform due to a large size and difficult to improve in its machining accuracy, it is possible to attain a reduction in weight. Further, by mitigating the demand on machining accuracy, it becomes possible to facilitate the manufacture.

According to the rotary cathode X-ray tube equipment in the twenty-sixth aspect of the present invention, since the drive means used is composed of a stator disposed on the side opposite to a subject insertion hole with respect to the vacuum vessel and a rotor disposed within the vacuum vessel and fixed to the rotary member, the movable range of the tilting mechanism can be widened by decreasing the thickness of the equipment.

According to the rotary cathode X-ray tube equipment in the twenty-seventh aspect of the present invention, the stator is constituted by at least one rectilinear or arcuate stator, and the stator and the rotor constitute a linear induction motor, so by keeping the mounting space for the stator to a minimum required, it is made possible to attain the reduction of size and weight.

According to the rotary cathode X-ray tube equipment in the twenty-eight aspect of the present invention, since the yoke facing portion of the outer ring is thinner than the yoke non-facing portion thereof, it is possible to obtain a large driving force of the motor.

According to the rotary cathode X-ray tube equipment in the twenty-ninth aspect of the present invention, the equipment is of a structure in which the object to be attracted reinforces the rotary members so by omitting the use of a special component for reinforcement it is possible to attain a structural simplification and the reduction of weight.

According to the rotary cathode X-ray tube equipment in the thirtieth aspect of the present invention, the equipment is provided with an encoder for detecting a rotational angle of the rotary member, and this encoder is composed of a light emitter and a photosensor which are disposed on both sides of the rotary member, as well as a plurality of detection holes formed in the rotary member in positions where the light from the light emitter passes, so by arranging the detection holes in spaced positions from the rotational axis of the rotary member, it is possible to improve the detection accuracy. In addition a high reliability is attained because of a non-contact structure.

According to the rotary cathode X-ray tube equipment in the thirty-first aspect of the present invention, since the light emitter and the photosensor are attached to inner plates mounted to the vacuum vessel, it is possible to facilitate a fine adjustment of the mounting positions of the light emitter and the photosensor.

According to the rotary cathode X-ray tube equipment in the thirty-second aspect of the present invention, the equipment is provided with a multiplying circuit, the multiplying circuit comprising a phase comparator to which is inputted an output signal from an encoder, a VF converter for converting an output signal of the phase comparator into a pulse having a frequency proportional to the voltage thereof, and a frequency divider circuit which counts pulses provided from the VF converter and outputs one pulse to the phase comparator at every counting of a preset number, the phase comparator comparing the phase of the output signal from the encoder with that of the output signal from the frequency divider circuit. Therefore, by suppressing the number of pulses of the output signal from the encoder, it becomes easy to machine the detection holes in the rotary member and it is possible to use a photosensor which is low in response frequency.

While preferred embodiments of the invention have been described using specific terms, such description is for illustrative purposes only, and it is to be understood that changes and variations may be made without departing from the spirit or scope of the following claims.

What is claimed is:

1. Rotary cathode X-ray tube equipment comprising:
   a ring-shaped hollow vacuum vessel;
   a ring-shaped anode target fixed within said vacuum vessel;
   a ring-shaped rotary member rotatably disposed in an opposed relation to said anode target within said vacuum vessel;
   at least one cathode portion attached to said rotary member on the side opposed to said anode target, said cathode portion including at least one filament;
   an X-ray radiation window for passing the X-ray generated at the anode target therethrough, said X-ray radiation window being mounted to an inner ring of said vacuum vessel;
   an electromagnet fixed to said vacuum vessel, said electromagnet comprising a yoke portion, a part of which is arranged in said vacuum vessel and a coil portion which is arranged outside of said vacuum vessel; and
   a power generating coil fixed to said rotary member to rotate together therewith and thereby pass across the magnetic field created by said electromagnet for generating electric power to be supplied to said at least one filament.

2. Rotary cathode X-ray tube equipment comprising:
   a ring-shaped hollow vacuum vessel;
   a ring-shaped anode target fixed within said vacuum vessel;
   a ring-shaped rotary member rotatably disposed in an opposed relation to said anode target within said vacuum vessel;
   at least one cathode portion attached to said rotary member on the side opposed to said anode target, said cathode portion including at least one filament;
   an X-ray radiation window for passing the X-ray generated at the anode target therethrough, said X-ray radiation window being mounted to an inner ring of said vacuum vessel;
   an electromagnet fixed to said vacuum vessel;
   a power generating coil fixed to said rotary member to rotate together therewith and thereby pass across the magnetic field created by said electromagnet for generating electric power to be supplied to said at least one filament; and
   a magnetic field detector which is fixed to said vacuum vessel and which detects a magnetic field created in said power generating coil on the basis of an electric current flowing therethrough.

3. Rotary cathode X-ray tube equipment, comprising:
   a ring-shaped hollow vacuum vessel;
   a ring-shaped anode target fixed within said vacuum vessel;
   a ring-shaped rotary member rotatably disposed in an opposed relation to said anode target within said vacuum vessel;
   at least one cathode portion attached to said rotary member on the side opposed to said anode target, said cathode portion including at least one filament;
   an X-ray radiation window for passing the X-ray generated at the anode target therethrough, said X-ray radiation window being mounted to an inner ring of said vacuum vessel;
   an electromagnet fixed to said vacuum vessel;
   a power generating coil fixed to said rotary member to rotate together therewith and thereby pass across the magnetic field created by said electromagnet for generating electric power to be supplied to said at least one filament; and
   a magnetic levitation mechanism having a magnet for magnetic levitation and wherein a common magnet is used for both said electromagnet and said magnet for magnetic levitation.

4. Rotary cathode X-ray tube equipment according to claim 3, wherein said electromagnet comprises a yoke portion and only said yoke portion is arranged in said vacuum vessel.

5. Rotary cathode X-ray tube equipment according to claim 3, wherein space within said vacuum vessel is divided into two parts by said rotary member, said anode target and said cathode portion are disposed in one of said two parts, and said power conducting portion and said filament current supply means are disposed in the other of said two parts.

* * * * *